(12) United States Patent
Sanchez Loureda

(10) Patent No.: US 9,483,737 B2
(45) Date of Patent: Nov. 1, 2016

(54) IDENTIFYING AN EVENT ASSOCIATED WITH CONSUMPTION OF A UTILITY

(75) Inventor: Jose Manuel Sanchez Loureda, London (GB)

(73) Assignee: Onzo Limited, London (GB)

( * ) Notice: Subject to any disclaimer, the term of this patent is extended or adjusted under 35 U.S.C. 154(b) by 441 days.

(21) Appl. No.: 14/118,219

(22) PCT Filed: May 18, 2012

(86) PCT No.: PCT/GB2012/051138
§ 371 (c)(1),
(2), (4) Date: Jan. 14, 2014

(87) PCT Pub. No.: WO2012/156758
PCT Pub. Date: Nov. 22, 2012

(65) Prior Publication Data
US 2014/0172772 A1    Jun. 19, 2014

(30) Foreign Application Priority Data

May 18, 2011    (GB) .................................. 1108357.3

(51) Int. Cl.
G06F 9/44    (2006.01)
G06N 7/00    (2006.01)
G01D 4/00    (2006.01)

(52) U.S. Cl.
CPC ................ *G06N 7/005* (2013.01); *G01D 4/00* (2013.01); *Y02B 90/245* (2013.01); *Y04S 20/40* (2013.01)

(58) Field of Classification Search
None
See application file for complete search history.

(56) References Cited

U.S. PATENT DOCUMENTS

| 4,335,447 A | 6/1982 | Jerrim |
| 4,858,141 A | 8/1989 | Hart et al. |
| 5,483,153 A | 1/1996 | Leeb et al. |
| 5,600,576 A | 2/1997 | Broadwater et al. |
| 6,195,018 B1 | 2/2001 | Ragle et al. |
| 6,470,283 B1 | 10/2002 | Edel |

(Continued)

FOREIGN PATENT DOCUMENTS

| CN | 201210176 | 3/2009 |
| DE | 19535719 | 3/1997 |

(Continued)

OTHER PUBLICATIONS

Paatero et al. "A model for generating household electricity load profiles", Int. J. Energy Research, 2006, pp. 273-290.*

(Continued)

*Primary Examiner* — Li-Wu Chang
(74) *Attorney, Agent, or Firm* — Arent Fox LLP

(57) ABSTRACT

A method of identifying an event associated with consumption of a utility comprising the steps of generating a utility consumption profile from utility consumption data, the utility consumption data comprising a plurality of utility consumption values measured at a corresponding plurality of measurement points, detecting a plurality of events within the utility consumption profile, grouping the plurality of events using a clustering process to produce a probability density map, comparing the probability density map to a stored profile of events of a particular type, and identifying the group of events as events of the particular type when the probability density map corresponds to the stored profile of events of the particular type, wherein the probability density map is compared to a stored profile of an event which is a probability density map.

35 Claims, 18 Drawing Sheets

(56) References Cited

U.S. PATENT DOCUMENTS

| | | |
|---|---|---|
| 6,507,794 B1 | 1/2003 | Hubbard et al. |
| 6,826,513 B1 | 11/2004 | Kumar et al. |
| 6,885,309 B1 | 4/2005 | Van Heteren |
| 7,146,288 B1 | 12/2006 | Welch |
| 7,260,272 B2 | 8/2007 | Lin et al. |
| 7,353,245 B2 | 4/2008 | Healey et al. |
| 7,379,791 B2 | 5/2008 | Tamarkin et al. |
| 7,467,170 B1 | 12/2008 | Chen et al. |
| 7,502,698 B2 | 3/2009 | Uenou et al. |
| 7,511,609 B2 | 3/2009 | Hammerschmidt |
| 7,639,129 B2 | 12/2009 | Bickel et al. |
| 7,693,670 B2 | 4/2010 | Durling et al. |
| 8,103,465 B2 | 1/2012 | Brzezowski et al. |
| 8,150,950 B2 | 4/2012 | Mcquillan et al. |
| 8,156,055 B2 | 4/2012 | Shimada et al. |
| 8,201,105 B2 | 6/2012 | Tabe |
| 8,214,270 B2 | 7/2012 | Schaefer et al. |
| 8,271,147 B2 | 9/2012 | Beal et al. |
| 2001/0011278 A1 | 8/2001 | Shimokawa et al. |
| 2003/0158826 A1 | 8/2003 | Burke et al. |
| 2004/0008904 A1 | 1/2004 | Lin et al. |
| 2004/0044713 A1 | 3/2004 | Healey et al. |
| 2004/0153170 A1 | 8/2004 | Santacatterina et al. |
| 2005/0190074 A1 | 9/2005 | Cumeralto et al. |
| 2007/0013499 A1 | 1/2007 | Hammerschmidt |
| 2007/0241739 A1 | 10/2007 | Uenou et al. |
| 2008/0079741 A1 | 4/2008 | Martin et al. |
| 2009/0045804 A1 | 2/2009 | Durling et al. |
| 2009/0066528 A1 | 3/2009 | Bickel et al. |
| 2009/0088991 A1 | 4/2009 | Brzezowski et al. |
| 2009/0307178 A1 | 12/2009 | Kuhns et al. |
| 2010/0174643 A1 | 7/2010 | Schaefer et al. |
| 2010/0217450 A1 | 8/2010 | Beal et al. |
| 2010/0217452 A1 | 8/2010 | Mccord et al. |
| 2011/0004421 A1 | 1/2011 | Rosewell et al. |
| 2011/0121988 A1* | 5/2011 | Chuang ............... H04Q 9/00 340/870.01 |
| 2011/0213556 A1 | 9/2011 | Yu et al. |
| 2012/0197594 A1 | 8/2012 | Orth et al. |

FOREIGN PATENT DOCUMENTS

| | | |
|---|---|---|
| EP | 295864 | 9/1990 |
| EP | 1309062 | 3/2004 |
| EP | 0863596 | 3/2008 |
| EP | 2026299 | 2/2009 |
| EP | 2237212 | 10/2010 |
| EP | 2290328 | 3/2011 |
| EP | 2141464 | 9/2011 |
| GB | 1012499 | 12/1965 |
| GB | 1107993 | 3/1968 |
| GB | 2300721 | 11/1996 |
| GB | 2420863 | 6/2006 |
| GB | 2409048 | 7/2007 |
| GB | 2461915 | 12/2010 |
| GB | 2472251 | 2/2011 |
| GB | 2473596 | 3/2011 |
| GB | 2471536 | 6/2011 |
| GB | 2490882 | 11/2012 |
| GB | 1108357.3 | 9/2013 |
| JP | 2008202818 | 9/2008 |
| JP | 4976158 | 7/2012 |
| WO | 0302346 | 3/2004 |
| WO | 2008142425 | 11/2008 |
| WO | 2008142431 | 11/2008 |
| WO | 2009014995 | 1/2009 |
| WO | 2009016580 | 5/2009 |
| WO | 2009081407 | 3/2010 |
| WO | 2010007369 | 3/2010 |
| WO | 2009103998 | 4/2010 |
| WO | 2010129414 | 11/2010 |
| WO | 2010106253 | 12/2010 |
| WO | 2011002735 | 1/2011 |
| WO | 2011058328 | 9/2011 |
| WO | 2011000356 | 1/2012 |
| WO | 2012156758 | 11/2012 |
| WO | WO2012156758A11 | 11/2012 |

OTHER PUBLICATIONS

Caron et al. "Incentive-based Energy Consumption Scheduling Algorithms for the Smart Grid", TR CSE-10-003, 2010, pp. 14.*
Intellectual Property Office, Search Report under Section 17 for GB0922164.9, dated Apr. 21, 2011.
European Search Report & Search Opinion for EP12183390.9, mailed Jan. 25, 2013.

* cited by examiner

IDENTIFYING AN EVENT ASSOCIATED WITH CONSUMPTION OF A UTILITY

CROSS-REFERENCE TO RELATED APPLICATIONS

This application is a United States National Stage Application under 35 U.S.C. §371 of International Patent Application No. PCT/GB2012/051138, filed May 18, 2012, which claims the benefit of and right of priority to GB Application No. 1108357.3, filed May 18, 2011, and the entirety of both applications are hereby incorporated herein by reference.

FIELD OF THE INVENTION

This invention relates to methods, systems, devices and computer code for identifying events associated with consumption of utilities, in particular consumption of gas, water and electricity, and using measured utility consumption data for applications such as analysis of household power consumption by an end-user or by a utility supplier, or monitoring occupancy and activity within a household.

BACKGROUND

There is an ongoing and urgent need to reduce consumption of energy and water both for environmental and cost reasons.

A large proportion of the energy and water supplied by utilities suppliers is wasted as a result of inefficiencies such as use of electrical appliances that have poor efficiency or for behavioural reasons such as appliances that are left switched on and so consume electricity even when not in use, or excessive consumption of water. This leads to wastage and increased utilities costs. Moreover, with respect to electricity, electrical energy use in buildings accounts for a very large proportion of all carbon emissions. Demand for utilities can vary dramatically between identical buildings with the same number of occupants, and this suggests that reducing waste through behavioural efficiency is essential. Therefore, efforts are required to change the patterns of utilities use by consumers.

The utilities suppliers recognise three major obstacles to progress in this objective: a shortage of sources of competitive advantage, a lack of detailed understanding of their customers, and a lack of "touch points", i.e. ways of interacting with the customers. Opportunities for differentiation revolve mainly around price and "green" issues, i.e. reduction of environmental impact. The utilities suppliers have very little information about their customers' behaviour since electricity, gas and water meters collect whole house data continuously and are read infrequently.

Meters to measure total consumption of utilities of a household are commonplace for each of gas, electricity and water, however this total is not useful in identifying areas in which efficiencies may be possible (for brevity, we refer herein to a "household", however it will be appreciated that the present invention is not limited to a domestic house but may be applied to any domestic, workplace or other setting that receives its own discrete utility supply, in particular mains electricity supply from an electricity grid; water supply; and/or gas supply).

A clamp-on energy meter for monitoring the consumption of electricity supplied on a cable is disclosed in WO 2008/142431. While a meter of this type is beneficial in assisting a user to review energy consumption patterns, there remains a need for yet more detailed information on user consumption of utilities supply, in particular electricity and water.

It is therefore an object of the invention is to provide technical means for generating detailed information on utilities consumption within a household.

SUMMARY OF THE INVENTION

The present inventors have found that it is possible to identify events associated with consumption of utilities (for example the filling of a sink with water or the switching on of a kettle) based on data derived from measurements of utility consumption.

For instance, operation of any given electrical appliance makes a series of power demands in a certain order, giving it a unique power "signature" associated with operation of that appliance. Data derived from measurements of the changes in power demand of a household over time can be analysed to identify events associated with operation of known appliances in order to match the electricity consumption of appliances in a household to known appliances and to provide detailed information of energy consumption associated with each identified appliance.

"Appliance" as used herein means any device that consumes one or more supplied utility, in particular gas, electricity or water.

Accordingly, in a first aspect the invention provides a method of identifying an event associated with consumption of a utility comprising the steps of:

generating a utility consumption profile from utility consumption data, the utility consumption data comprising a plurality of utility consumption values measured at a corresponding plurality of measurement points;

detecting a plurality of events within the utility consumption profile;

grouping the plurality of events using a clustering process to produce a probability density map;

comparing the probability density map to a stored profile of events of a particular type; and identifying the group of events as events of the particular type when the probability density map corresponds to the stored profile of events of the particular type;

wherein the probability density map is compared to a stored profile of events of a particular type which is a probability density map.

Preferably, the determination whether the probability density map of the plurality of events corresponds to the stored profile is carried out by calculating the probability that the probability density map of the clustered plurality of events corresponds to an event of the type represented by the probability density map.

Preferably, the probability is calculated by comparing the respective covariance matrices of the probability density map of the clustered plurality of events and the probability density map of the stored profile of events.

Preferably, the probability is calculated by also comparing the respective number of clusters and the cluster centre locations of the probability density map of the clustered plurality of events and the probability density map of the stored profile of events.

Preferably, the determination whether the probability density map of the plurality of events corresponds to the stored profile is carried out by comparing the probability to a predetermined threshold value, and the probability density map of the plurality of events is determined to match the stored profile when the probability exceeds the threshold value.

Preferably, the probability density map of the plurality of events is compared to a plurality of probability density maps of stored profiles of events and the plurality of events are determined to match the stored profile having the highest probability value.

Preferably, the probability density maps are two dimensional probability density maps.

Preferably, the probability density maps are three dimensional probability density maps.

Preferably, the plurality of events are classified as periodic or non-periodic before comparing the probability density map of the plurality of events with the probability density map of the stored profile of events.

Preferably, the plurality of events are classed as periodic if another event follows each of the plurality of events with a separation in time value below a predetermined threshold.

Preferably, the plurality of events are classed as non-periodic the probability density maps are two-dimensional; and if the plurality of events are classed as periodic the probability density maps are three-dimensional.

Preferably, one dimension of each three-dimensional probability density map is a separation in time value.

Preferably, if the probability density map of the plurality of events corresponds to the stored profile of events of the particular type the probability density map of the plurality of events is stored as a utility consumption profile.

Preferably, a subsequent step of identifying an event associated with consumption of a utility comprises the further steps of: generating a utility consumption profile from utility consumption data, the utility consumption data comprising a plurality of utility consumption values measured at a corresponding plurality of measurement points; detecting an event within the utility consumption profile; comparing the detected event to the stored profile of an event; and identifying the detected event within the utility consumption profile when the detected event matches the stored profile of an event.

Preferably, the determination whether the detected event matches the stored profile is carried out by calculating the probability that the detected event is an event of the type represented by the probability density map.

Preferably, the determination whether the detected event matches the stored profile is carried out by comparing the probability to a predetermined threshold value, and the detected event is determined to match the stored profile when the probability exceeds the threshold value.

Preferably, the detected event is compared to a plurality of stored profiles of events and the stored profile is determined to match the stored profile having the highest probability value.

Preferably, the probability is determined based upon a Mahalanobis distance of the detected event from a cluster centre of the probability density map.

Preferably, the probability density map is a two dimensional probability density map.

Preferably, the probability density map is a two dimensional probability density map.

Preferably, the detected event is classified as periodic or non-periodic before comparing the detected event with the utility consumption profile.

Preferably, the detected event is classed as periodic if another event having a similar size to the detected event follows the detected event with a separation in time value below a predetermined threshold.

Preferably, if the detected event is classed as non-periodic the detected event is compared to a two-dimensional probability density map; and if the event is classed as periodic the detected event is compared to a three-dimensional probability density map.

Preferably, one dimension of the three-dimensional probability density map is the separation in time value.

Preferably, the utility is selected from gas, electricity and water.

Preferably, the utility is electricity.

Preferably, the measured electricity consumption data includes data of real power.

Preferably, the measured electricity consumption data includes data of reactive power.

Preferably, the measured electricity consumption data includes data of reactive power and real power.

Preferably, the utility is water.

Preferably, the plurality of measurement points are a plurality of time points with intervals therebetween.

Preferably, the intervals between time points are in the range 0.01-60 seconds.

In a second aspect the invention provides a computer program code which when run on a computer causes the computer to perform the method according to the first aspect.

In a third aspect the invention provides a carrier medium carrying computer readable code which when run on a computer causes the computer to perform the method according to the first aspect.

Preferably, the computer program product comprises computer readable code according to the third aspect.

In a fourth aspect the invention provides a computer-implemented event identification apparatus adapted to carry out the method according to the first aspect. In a fifth aspect the invention provides an article of manufacture comprising: a machine-readable storage medium; and executable program instructions embodied in the machine readable storage medium that when executed by a programmable system causes the system to perform the function of identifying an event associated with consumption of a utility comprising the steps of the first aspect.

The invention further provides systems, devices, computer-implemented apparatus and articles of manufacture for implementing any of the aforementioned aspects of the invention; computer program code configured to perform the steps according to any one of the aforementioned methods; a computer program product carrying program code configured to perform the steps according to any one of the aforementioned methods; and a computer readable medium carrying the computer program.

DESCRIPTION OF FIGURES

The invention will now be described in detail with reference to the following figures in which:

FIG. 12b shows a more detailed illustration of parts of the flowchart of FIG. 12a.

FIG. 12c shows a more detailed illustration of parts of the flowchart of FIG. 12a.

DETAILED DESCRIPTION OF THE INVENTION

Appliance Identification

Figure 1:
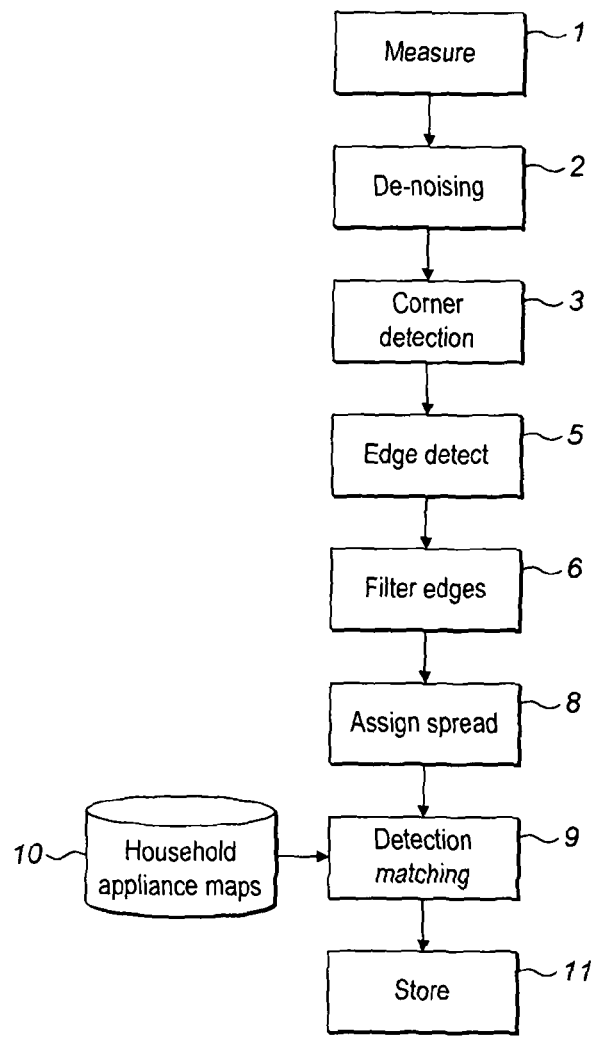
FIG. 1 is a flowchart illustrating measuring, analysis and matching steps according to the method of the invention.

The method according to the present application is illustrated in FIG. 1 with respect to electricity consumption, and may be divided into three broad steps: (A) Measurement of electrical data at measurement points, preferably at regularly spaced time points; (B) Creation of an electricity consumption profile based in particular on changes in electricity demand, in particular power, between measurement points; and (C) Matching events within the measured electricity consumption profile to energy consumption profiles stored in a database and associated with known events.

In the illustrated examples these three broad steps are comprised of:

A) Measurement: Capture of the raw household data.

B) Profile Creation: De-noising (Wavelets), Compression Algorithm (Corner Detection), On/Off Edge Detection Algorithm, Filtering Edges Algorithm (On/Off Edge Matching), Assign Spread Algorithm.

Each of these steps is described in more detail below. While the method is described hereinafter primarily with respect to measurement and analysis of electricity consumption, in order to identify events and appliances associated with consumption of electricity, it will be appreciated that the same steps may equally be taken using data relating to consumption of gas or water utilities.

A) Measurement

A sensing device such as a clamp-on energy meter as disclosed in WO 2008/142431 measures real and reactive power at time points in step 1. In preferred embodiments the measurements are made at regularly spaced fixed time points. A higher frequency of measurement will obviously yield more electricity consumption data, which in turn increases the likelihood of an accurate match when the profile generated from the measured data is compared to stored electricity consumption profiles. Typically, electricity consumption is measured at least once every second. This electricity consumption data typically may comprise real power and/or reactive power and is preferably captured as two separate streams of data, one stream of data comprising measurements of real power consumption, and the other stream of data comprising measurements of reactive power consumption ("real power" and "reactive power" as used herein have the meanings as understood by a skilled person in the art in relation to power supplied to a load from an alternating current source). One advantage of measuring both real and reactive power is that, between them, it is possible to measure power demand of most or all appliances. For instance, it may be difficult or impossible to obtain a meaningful measurement of real power for certain appliances such as set-top boxes, however reactive power for these devices can be measured.

Preferably, energy consumed at fixed time intervals may also be measured, typically every second. From this can be calculated a running total of energy consumed over longer periods, for example every 300 seconds, 900 second, 512 seconds, 2048 seconds or 86,400 seconds (24 hours). These measurements can also be used to show the maximum and minimum energy usages over one of these longer time periods. Although these energy consumption measurements are not used in generating an "event matrix" as described in more detail below, this information is nevertheless beneficial in providing a detailed picture of energy consumption over the course of an extended time period during which various appliances may be switched on and off.

Consumption of water and gas can be measured using techniques that are well known to the skilled person, for example based on use of water and gas meters. Water and gas consumption, in particular water consumption, may be measured at a lower rate. Gas consumption may, for example, be measured at least once every 900 seconds, at least once every 300 seconds, or at least once every 60 seconds, in order to generate gas consumption data that may be used to identify events associated with consumption of gas. The rate of flow of water or gas at each time interval may be measured, along with the total volume consumed over time in a manner analogous to power and energy measurements of electricity consumption. Additionally or alternatively, water and gas consumption may be measured at measurement points after intervals of volume consumption rather than intervals of time, for example a measurement of time elapsed for each unit volume (e.g. litre) of water to be consumed.

The power consumption measurements are then de-noised using a filtering process in filtering step 2. The filtering process uses an appropriate de-noising filtering process such as wavelet shrinkage. The use of a de-noising filtering process is particularly advantageous because in a real household supply there may be times when either the supply is inherently noisy or the particular devices in the home produce large power fluctuations as part of their normal mode of operation (for example PCs, TVs, ...). Wavelet shrinkage is a particularly effective method of carrying out the de-noising filtering. An example of a suitable wavelet shrinkage process by which this pre-processing, or "cleaning up", of the signal might be achieved is described in more detail in our co-pending UK patent application GB1012499.8.

Creation B) Compression and Profile Creation

As shown in FIG. 1, the filtered and de-noised electricity consumption data relating to real and reactive power is fed into a compression algorithm, referred to hereinafter as a "corner detection algorithm" to compress the data in a compression step 3.

Figure 2:
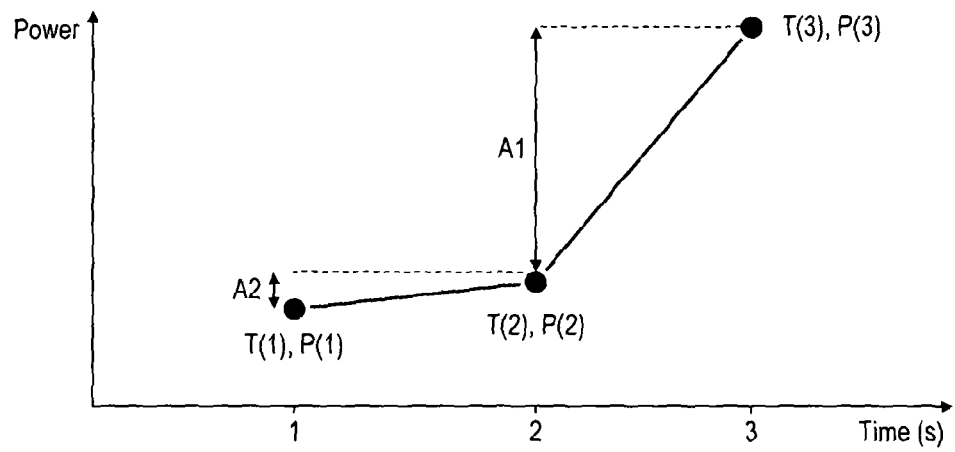
FIG. 2 illustrates the identification of "corners" in electricity consumption data.

The operation of the corner detection algorithm is illustrated schematically in FIG. 2. The compression algorithm identifies "corners" in power demand by identifying differences in the gradient representing rate of change in power from one time point to the next. A point at which there is change in gradient between two time intervals (identified as T(2), P(2)) is marked as a "corner" if that change is greater than a predetermined threshold. This is done by measuring the power difference between points T(3), P(3) and T(2), P(2) and between T(2), P(2) and T(1), P(1) to give values A1 and A2 respectively. If the difference B between A1 and A2 exceeds a predetermined value Tol1 then a corner is marked.

Figure 4:
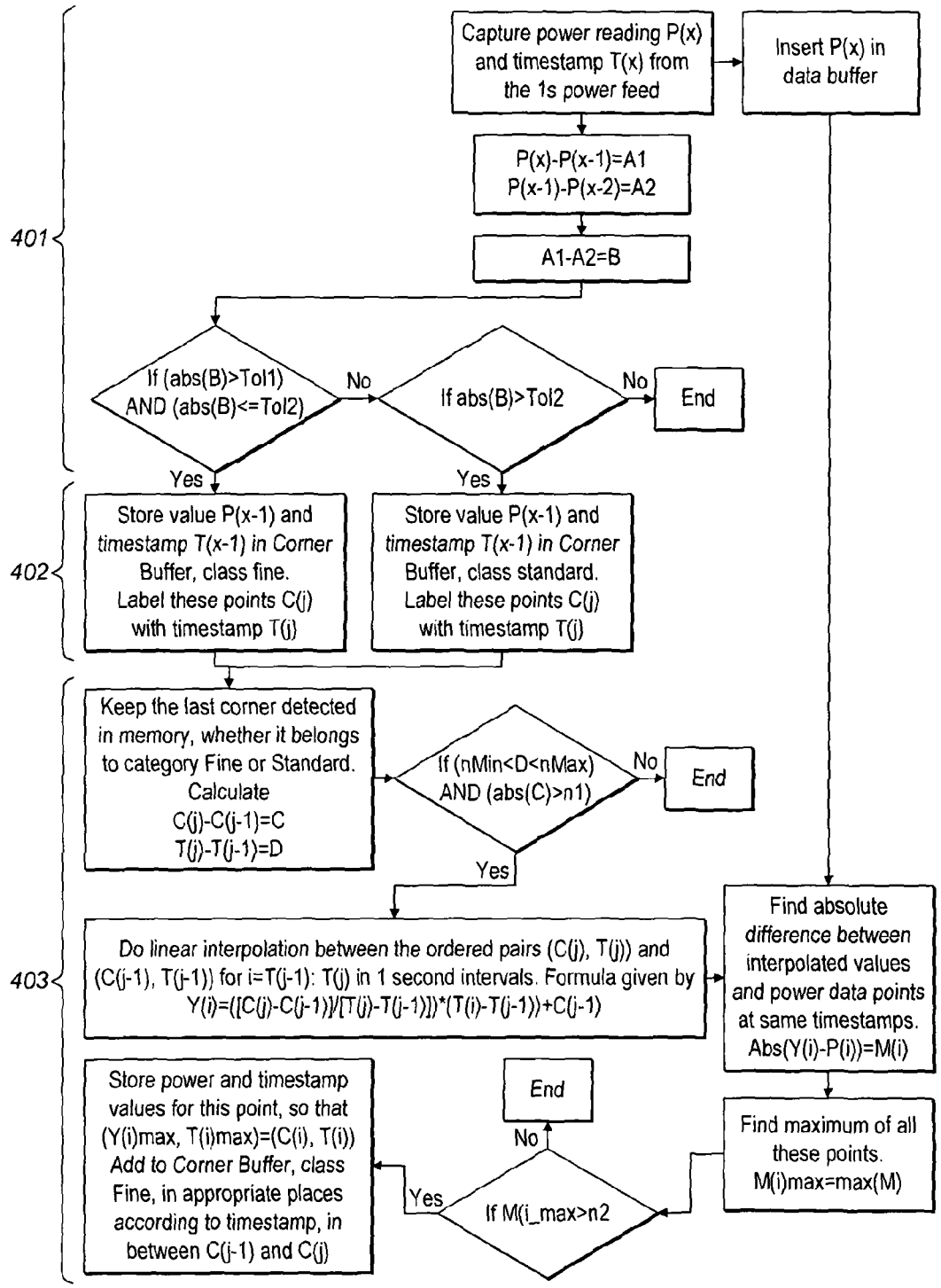
FIG. 4 is a flowchart illustrating the corner detection algorithm.

The operation of the algorithm is illustrated in more detail in FIG. 4 in which:

T(x), T(i) and T(j) represent 32 Bit timestamps

C(x), C(j) and Y(i) represent 16 Bit power readings at a corner

Tol1, Tol2 represent integer numerical values (0-100)

A1, A2, B represent 16 Bit power reading differences n1, nMax, nMin, n2 represent 16 Bit numerical values M(i), M(i)max represent 16 Bit numerical values Section 401 of FIG. 4 illustrates identification of corners as described above with reference to FIG. 2.

Section 402 of FIG. 4 illustrates the classification of corners into "Standard" and "Fine" classes depending, respectively, on whether B is greater than predetermined values Tol1 and Tol2 or greater than Tol1 only.

In any particular application of the invention an appropriate value of the threshold for marking a point as a corner can be selected. The specific value required will vary from case to case.

By measuring a plurality of these corners in the electricity consumption data, an 15 electricity consumption profile is generated, representing a series of events associated with changes in real and/or reactive power demand from which appliances may be identified using known "signature" profiles of those appliances.

Correction

The electricity consumption profile generated as described above with respect to FIG. 2 and sections 401 and 402 of FIG. 4 contains the majority of corners. However a correction may be applied if necessary to identify one or more corners that may have been missed. This correction process may be incorporated within step 3 of FIG. 1.

Figure 3:
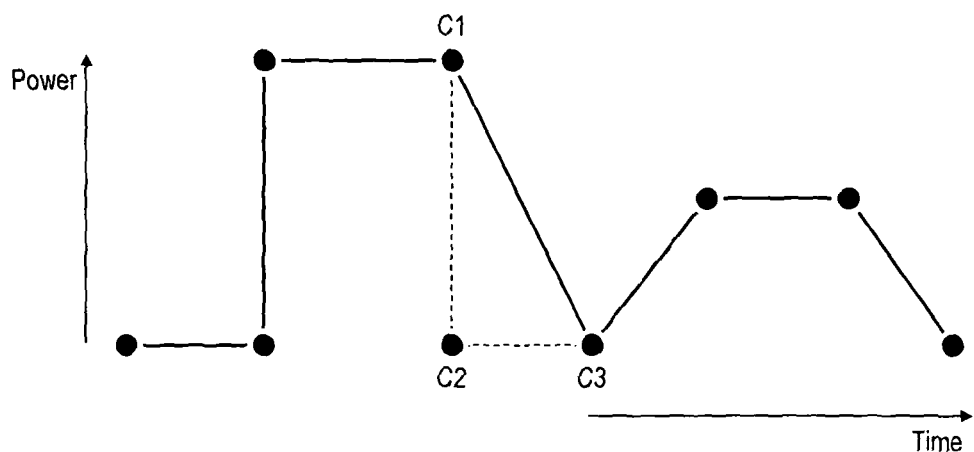
FIG. 3 illustrates schematically the identification of missing corners.

This process of identifying and correcting a missing corner is illustrated in FIG. 3 which shows a corner C(2) between corners C(1) and C(3) that has been missed by the corner detection algorithm.

A missing corner may be identified if both the power difference (power at C1−power at C2) and the time difference (time at C1−time at C2) fall outside defined values as illustrated in section 403 of FIG. 4.

In this event, linear interpolation may be conducted to identify any missing corners, as illustrated in Section 403 of FIG. 4. Referring to FIG. 3, missing corner C3 should be inserted at the point giving the most acute angle between lines C1-C2 and C2-C3.

The next part of the process comprises splitting up the series of corner data output from the compression algorithm into On/Off edges using an On/Off edge detection algorithm in step 5 of FIG. 1. These On/Off edges are each defined by two corners, which delimit the start and finish of the edge. Unique pairs of On/Off edges will be paired to form events. These events will form the building blocks for subsequently identifying appliance parts and also complete appliances. An appliance be associated with one or more different types of events (depending on the complexity of operation of the appliance), both in real and reactive power.

The On/Off edge detection algorithm in step 5 searches for possible On/Off edge pairs, where On edges are followed by Off edges having a similar size of change in power consumption in the opposite sense. This process produces a number of potential On/Off edge pairs, some of which may be mapped many to one. That is, there may be many possible Off edges for a specific On edge, or vice-versa.

In principle it would be possible to also consider event pairs where Off edges are followed by On edges having a similar size of change in power consumption. However, in practice it has been found to generally be more useful to consider On edges followed by Off edges.

For the next stage in the creation of a consumption profile, data regarding the On/Off edge pairs detected by the On/Off edge detection algorithm in step 5 are supplied to an edge filtering algorithm for On/Off edge matching in step 6. The On/Off edge matching by the edge filtering algorithm step 6 takes all of the potential On/Off edge pairs that have been detected by the On/Off edge detection algorithm in the preceding step 5 and operates on these to produce unique pairings, such that each On edge is unique, and is in turn matched uniquely to its corresponding unique Off edge. This matching produces unique On/Off edge pairings, which will be referred to below as events, and which are used in the following section to determine the appliance detections. Each event formed by an On edge followed by a paired Off edge potentially corresponds to an appliance being switched on and subsequently being switched off.

Figure 5:
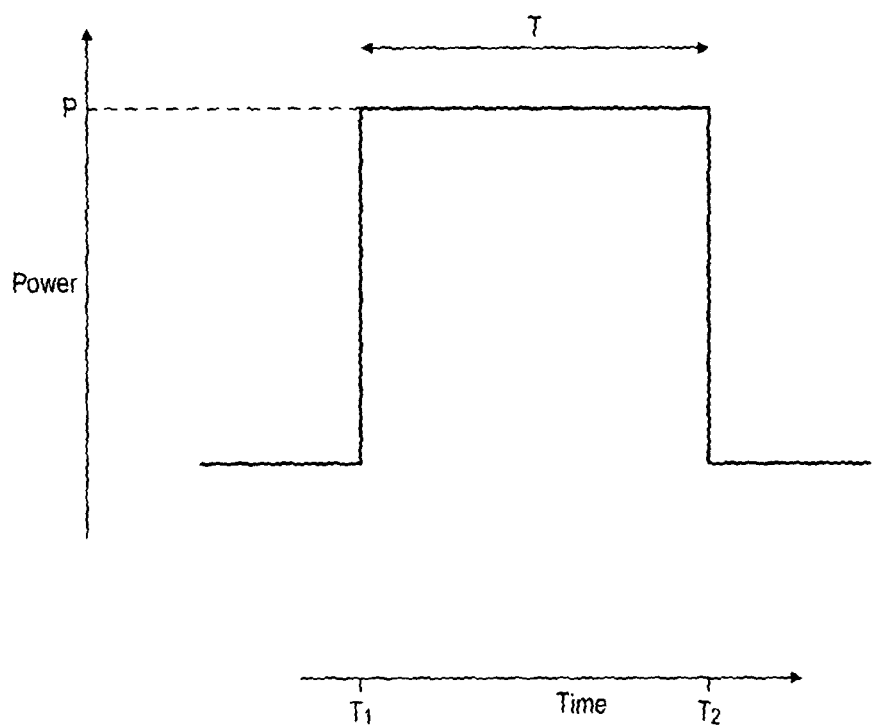
FIG. 5 illustrates an event according to the invention.

An example of an event comprising an On/Off pair produced by the matching process of the edge filtering algorithm in step 6 is shown in FIG. 5. In the illustrated example the event is defined by an On edge at a start time of the event $T_1$ and an Off edge at a finish time of the event $T_2$. Accordingly, the illustrated event has a duration T, where $T=T_2-T_1$. The illustrated event corresponds to a change in power consumption P.

As mentioned above, each On/Off edge is formed by a pair of corners which define the start and finish of the On/Off edge. Accordingly, an event made up of a pair of On/Off edges may be represented in the form of a matrix. In one possible approach, for the example of an On/Off pair shown in FIG. 5, the signature profile associated with the event may be defined by a matrix as follows:

|  | Event |  |
|---|---|---|
| Time → | Start | Finish |
|  | (1 2 | 4 7) |

The first entry in this event matrix represents the start index time of the On edge, the second entry the finish time of the On edge, the third entry the start time of the Off edge, and the final entry the finish time of the Off edge. That is, the four index values indicate the times of the four corners in the power consumption value defining the On/Off pair.

As the next step in the method the paired On/Off edges which have been paired together to define events in step 6 are supplied to a spread assigning algorithm in step 8. In step 8 the spread assigning algorithm assigns a spread to each event. The spread assigned to each event is determined by measuring the time distance between successive events which have a similar magnitude in power. That is, the spread of each periodic event is the time duration between the end of the periodic event and the start of the next event having a similar power change magnitude. This value is then assigned to the particular event from which the measurement occurred as a spread value. The maximum value of the spread may be limited to a predetermined threshold, with events having a larger spread being categorized as non-periodic. Conveniently, non-periodic events can be assigned a zero spread to identify them as non-periodic since a periodic event cannot have a zero spread.

Figure 6:
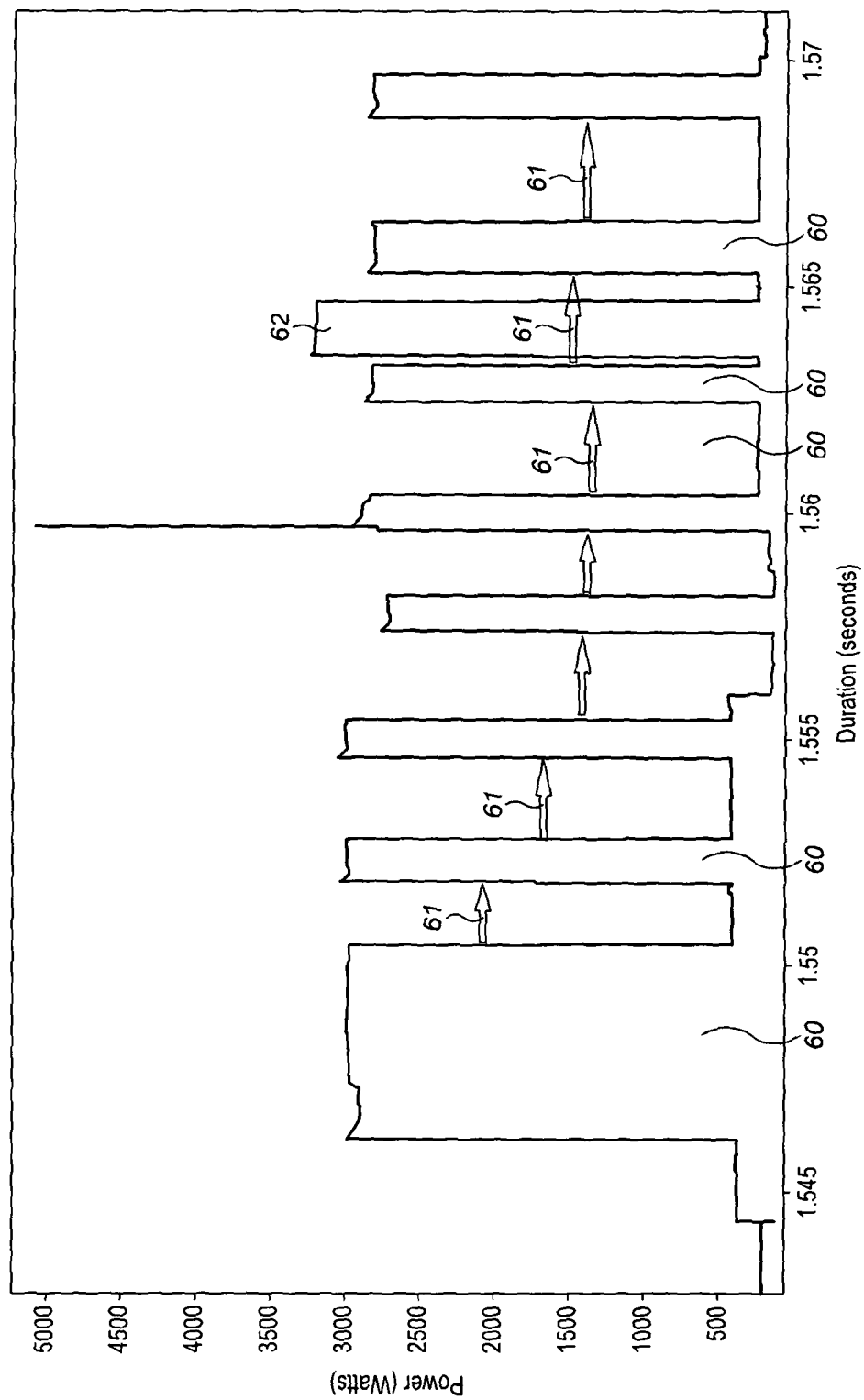
FIG. 6 illustrates the identification of "spread" in events.

The concept of spread will be explained further with reference to FIG. 6. FIG. 6 shows a series of events 60 with similar power magnitudes which have each been assigned a particular spread value 61. The illustrated series of events are a power consumption event series of an oven. As is shown in FIG. 6 the spread value extends in time from the Off edge of each event 60 to the On edge of the next successive event 60. Events with a significantly different power magnitude do not interfere with a series of similar events, but are rather treated independently. In FIG. 6 an event 62 having a significantly different power magnitude from events 60 takes place between two of the events 60 but the event 62 is ignored when assigning spread values to the events 60. The illustrated event 62 is a kettle power consumption event.

The spread assigned to each event is used to differentiate between periodic and non-periodic events. This distinction is useful and aids in the selection process which aims to identify distinct appliances.

The difference between power levels of events which are regarded as similar, and the length of the threshold maximum spread time can be selected in practice based on the properties of the system and the measured appliances. In one example a threshold time value of 250 seconds may be used.

C) Matching

The electricity consumption profile is analysed to determine if it contains a signature event series stored in a household appliance map database 10 in a comparison step 9. An event profile of one or more appliances believed to be present in the household and stored in the database 10 are compared to the measured utility consumption profile in order to identify whether the measured profile contains an event matching an event profile of an appliance believed to be present in the household. Examples of measured parameters which may be compared include the real power magnitude, and/or reactive power magnitude, and/or duration of the On and/or Off edges, etc.

For any given event, the event series profile for an appliance event contained within the database 10 comprises a plurality of entries showing at least one power change indicative of an event associated with that appliance. Typically, the event comprises a plurality of changes in power value, the magnitude and duration of which can be used to generate a signature event series for that event. However, it is possible that a single change in power value could be stored as an event series within the database, in particular if the magnitude of that change is large enough to provide a distinctive event series.

The electricity consumption event series profile of an event associated with a known appliance is represented in the form of an appliance event probability density map.

An appliance event probability density map can be produced from recorded event profiles of a known appliance by using an event clustering type approach. Such a clustering approach is illustrated by way of example in FIG. 7 where a plurality of recorded event profiles for a known event associated with operation of a known appliance, for example a kettle, are plotted on a graph of power consumption change against duration time, the duration time being the time between an On event and a subsequent Off event. The graph, or event map, of recorded events will tend to have a shape or geometry which corresponds to the physical processes occurring during operation of the device.

The event probability density map can be described by three parameters, c, r and µ, where c defines the number of clusters in the probability density map, µ defines the location of the centre of each cluster, and r is a covariance matrix defining the geometry, shape and size, of each cluster.

Figure 7:
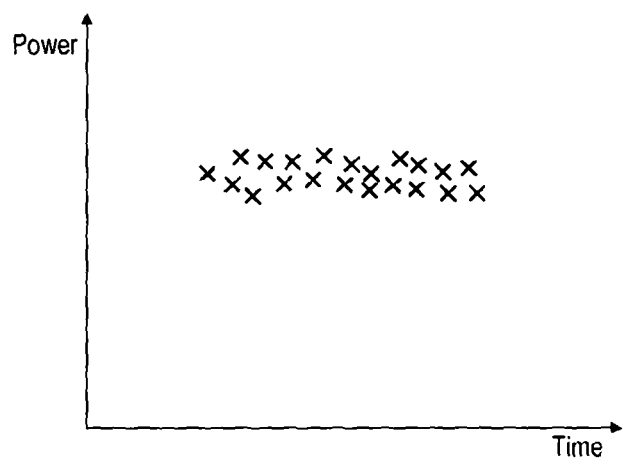
FIG. 7 illustrates a two-dimensional event map used in the method of the invention.

For example, as can be seen in FIG. 7, the event probability density map for a kettle tends to have event coordinates within a relatively narrow range of power change values, reflecting the fact that the power consumption of a kettle element is substantially constant. It will be understood that variations in power supply voltage and noise and errors in measurement will result in some variation in recorded power consumption even for an appliance having an apparently fixed power consumption. The event coordinates for a kettle will tend to have a rather broader range of duration times, reflecting the fact that the duration time will depend upon the amount of water in the kettle when it is used and the temperature of the water.

Figure 9:
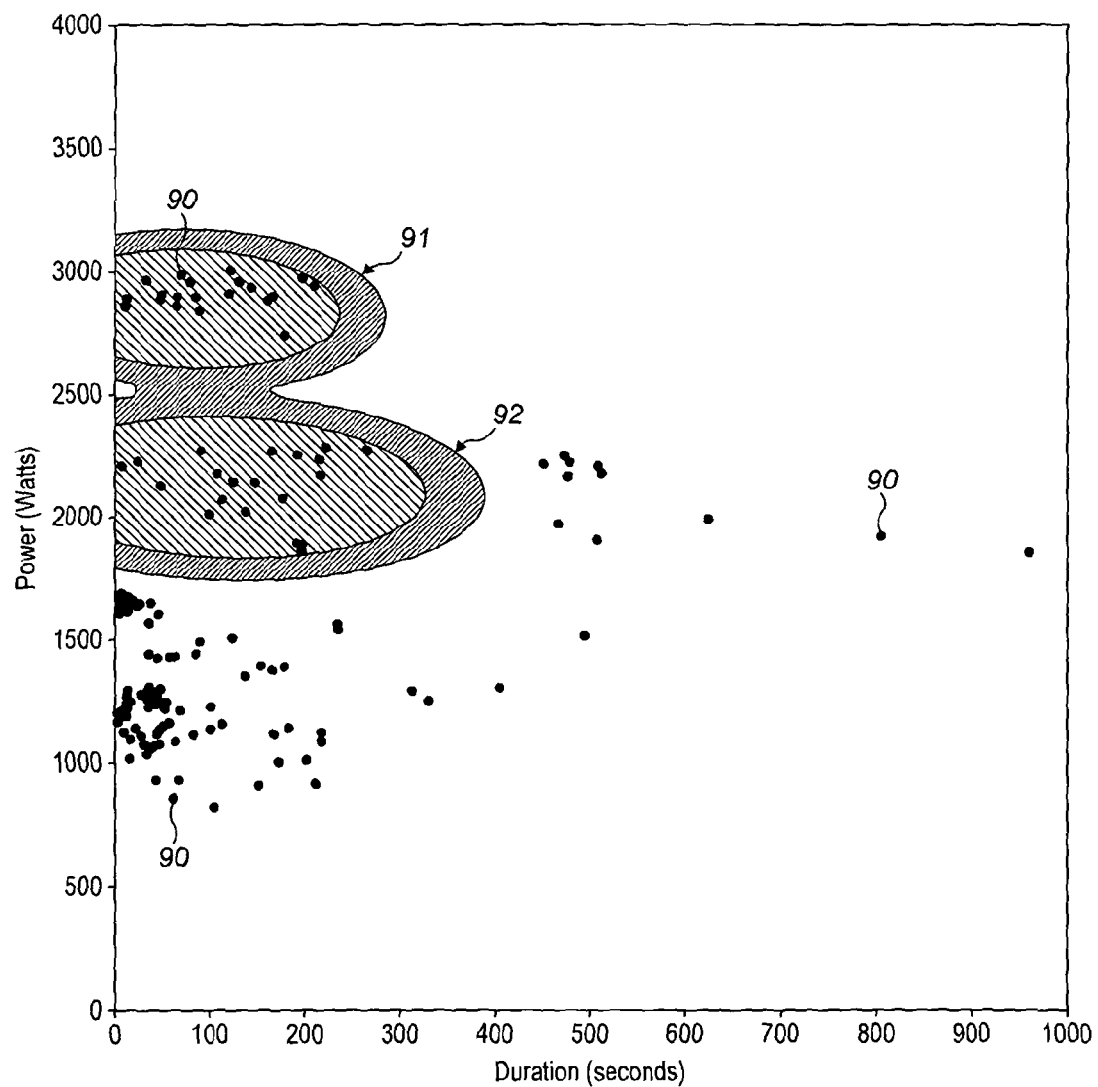
FIG. 9 illustrates an example of a two-dimensional event probability density map.

In order to determine the probability of a measured event being associated with operation of a known appliance the measured event values can be compared to the event probability density map to assess how closely the measured event values match the mapped profile of the known appliance event. In effect, plotting the measured event on the event probability density map and assessing the probability that the measured event is another example of the same appliance event used to generate the appliance event probability density map. In assessing this probability both the parameter values and the geometry of the event probability density map, for example the shape and size of the region within which the recorded events lie, can be taken into account, and a probability value Z assigned to the measured event indicating the probability that the measured event corresponds to the same known appliance event as the event map. This is illustrated in FIG. 9, which shows a plurality of events 90 plotted on a graph of power against duration. FIG. 9 also shows a pair of elliptical regions 91 and 92 defined by probability boundaries of an event map for a kettle. The probability boundaries connect points in the power/duration space giving the same probability that an event having the power consumption and duration of that location corresponds to a kettle operating. Each elliptical region 91, 92 has an inner region 91a, 92a defined within an inner, higher probability, boundary, and an outer region 91b, 92b lying between the inner, higher probability, boundary and an outer, lower probability, boundary. It will be understood that events 90 lying in the inner regions 91a, 92a are more likely to be a kettle than those lying in the outer regions 91b, 92b, which are in turn more likely to be a kettle than events 90 lying outside the elliptical regions 91 and 92.

Figure 8:
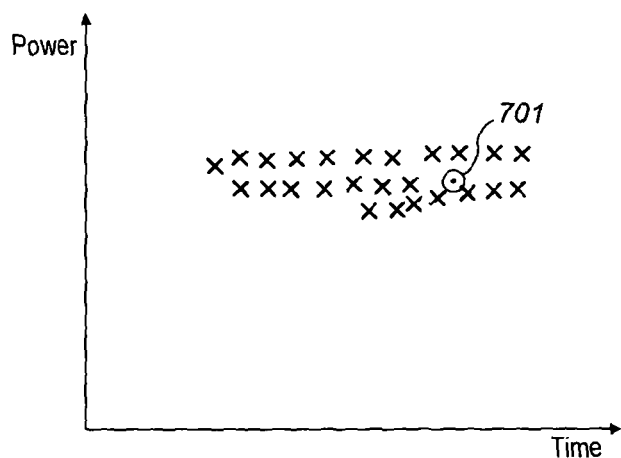
FIG. 8 illustrates a further two-dimensional event map used in the method of the invention.

For example, as shown in FIG. 8, for the kettle event map of FIG. 7 a measured point 701 may be assigned a probability value Z based on the relationship between the position of the measured point 701 and the position of the recorded events. In a preferred embodiment the probability value Z is based upon the Mahalanobis distance of the measured point 701 and the group of values of the recorded events forming the probability density map. In one embodiment the probability value Z may be assigned using the equation $Z=\exp(-d)^2$, where d is the Mahalanobis distance from the centre of a cluster. As is well known, a Mahalanobis distance takes into account the properties of a data set and is not a geometric distance. A Malahanobis distance takes into account the covariance matrix defining the shape of the probability density map clusters. Other methods of assigning a probability value will be known to the person skilled in statistics.

In a preferred embodiment the appliance event probability density maps are handled as described above for non-periodic events, but are handled differently for periodic events, as described below.

Figure 10A:
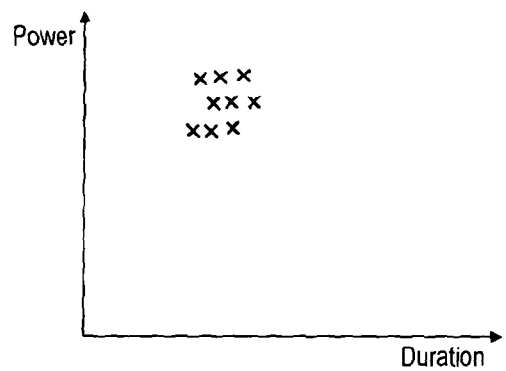
FIGS. 10A and 10B represent a three dimensional event map used in the method of the invention.
Figure 10B:
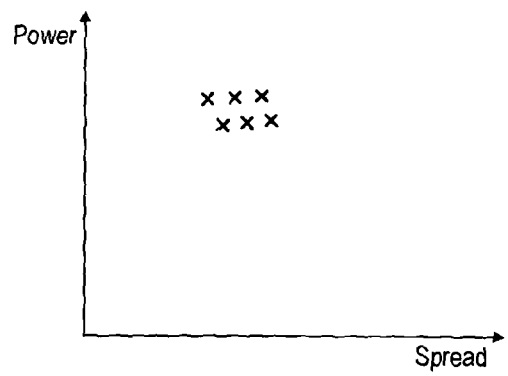

For periodic events, an appliance event probability density map plotting recorded values of duration and power value for recorded appliance events is generated as discussed above. However, for periodic events the appliance map is a three-dimensional map produced by plotting changes in real and reactive power, in other words total power, against duration and by also plotting the changes in real and reactive power against the spread of each of the periodic events. The spread of each periodic event is the time duration between the end of the periodic event and the start of the next event having a similar power change magnitude. Such a three-dimensional event map is represented in FIGS. 10A and 10B, where FIG. 10A shows a plurality of recorded event profiles for a known event associated with operation of a known appliance, for example a hob, plotted on a graph of power consumption change against duration time, while FIG. 10B shows the same plurality of recorded event profiles plotted on a graph of power consumption change against spread time. The skilled person will understand how these three parameter values can be combined to form a three-dimensional map or graph.

In order to determine the probability of a measured periodic event being associated with operation of a known appliance the measured event values can be compared to the event probability density map to assess how closely the measured event values match the mapped profile of the known appliance event. In assessing this probability both the parameter values and the geometry of the event map in all three dimensions, for example the shape and size of the region within which the recorded events lie, can be taken into account, and a probability value Z assigned to the measured event indicating the probability that the measured event corresponds to the same known appliance event as the event probability density map.

Figure 11A:
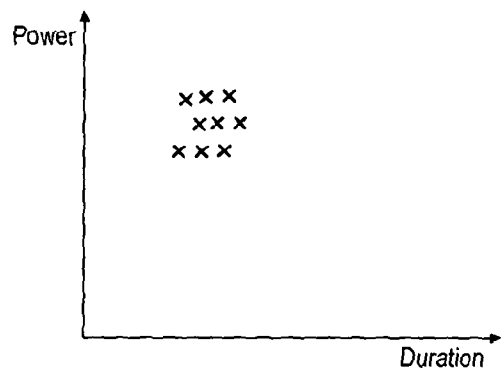
FIGS. 11A and 11B represent a three dimensional event map used in the method of the invention.
Figure 11B:
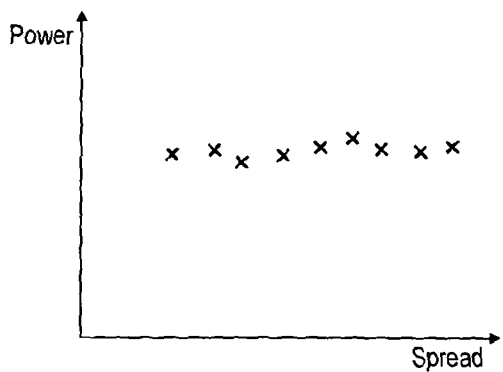

Taking spread time into account in a three-dimensional event map may provide advantages in distinguishing between devices generating periodic events which might otherwise be difficult to distinguish. For example, a cooker hob and an iron may produce similar two-dimensional event maps of total power against duration. However, they produce different three-dimensional event maps of total power against duration and spread. In general an iron will have a much greater range of variation in spread value than a hob. As one example FIG. 11A shows a plurality of recorded event profiles for a known event associated with operation of an iron, plotted on a graph of power consumption change against duration time, while FIG. 11B shows the same plurality of recorded event profiles plotted on a graph of power consumption change against spread time. Comparing FIGS. 10A and 10B with FIGS. 11A and 11B it can be seen that the graphs of power against duration in FIGS. 10A and 11A are very similar, but the graphs of power against spread in FIGS. 10B and 11B are rather different and can be readily distinguished. It should be understood that a single use of an appliance, such as an iron, may produce multiple events identifiable by the system, but all of these events are part of a single appliance usage event.

If desired, further statistical analysis of a series of periodic events may be carried out in order to more accurately assign a probability value to the periodic events being events associated with a specific known appliance.

Referring to FIG. 1, the measured events which have been assigned a spread value from the assign spread step 8 are then passed to a comparison step 9, which compares the measured event to event probability density maps of known events associated with appliances believed to be present and determines which appliance the measured event corresponds to based on the assigned probability values Z for the different appliance probability density maps of the different appliances.

In the comparison step 9 non-periodic events are compared to two-dimensional appliance probability density maps of non-periodic events associated with appliances believed to be present, while periodic events are instead compared to three-dimensional appliance probability density maps of periodic events associated with appliances believed to be present. In both cases the comparison step determines which appliance the measured event corresponds to based on the assigned probability values Z for the different appliances.

In both the two-dimensional and three-dimensional comparisons carried out in the comparison step 9 the measured event is identified as corresponding to the appliance believed to be present for which the assigned probability value is highest. The highest assigned probability value may also be compared to a predetermined threshold and the event instead classed as unidentified if the highest assigned probability value is below the threshold value.

In some cases the identified events may be grouped together before identifying them as part of a single appliance usage event. For example, some appliances may be composed of multiple operating parts, each of which has a corresponding appliance event probability map. The events corresponding to operation of these separate parts may need to be combined in particular ways in order to determine the probability that the overall appliance has been detected. For example, the different part of a complex appliance, such as a washing machine, may operate in a particular defined sequence.

If the measured event is identified as corresponding to an appliance believed to be present the event values and the appliance identity are stored in a storage step 11. The appliance identity is an identity assigned to a specific appliance in the household by the analysis system, this identity is not necessarily a specific appliance type and model.

In the embodiment described above events are matched to appliances based on the parameters real power, reactive power, duration and spread. In other embodiments different parameters and combinations of parameters may be used.

Other parameters associated with an event that may be used to determine a match include the following:

Minimum change in power
Maximum change in power
Minimum change in time
Maximum change in time
Peak power minimum
Peak power maximum
Minimum power change time after time 0
Maximum power change time after time 0
Minimum time to next event
Maximum time to next event
Power threshold (the minimum power change between measurement points).

The appropriate parameters to use may be determined by measuring event series of known appliances, and may vary depending upon what appliances are of interest. Each of these parameters may be determined for each specific make and model of an appliance and/or may be a generic parameter to be used for any member of a genus of appliances (for example, the genus of washing machines) wherein the generic parameter is determined by measuring a plurality of devices within a genus and determining a parameter value that is applicable to most or all members of the genus.

In the discussion above the use of two and three dimensional appliance event maps is discussed. The same principles may be extended to larger numbers of dimensions if larger numbers of relevant parameters are linked with each event.

In the illustrated examples the appliance event probability density maps each have a single cluster of associated event values. This is not essential. In practice some appliances may have associated event values which form an appliance event map having a plurality of clusters. Where an appliance has an appliance event map with a plurality of clusters, each cluster may be separately considered based on the size and geometry of that cluster when assigning a probability value Z to a measured event.

Different techniques can be used in identification of different appliance genera. Suitable techniques for any given genus will be apparent to the skilled person following measurement and analysis of event series for known appliances within each genus.

In this way, use of known appliance event series for common household appliances allows estimation of most or all of the constituents of measured electricity consumption data for the entire household, and allows for disaggregation of signals associated with operation of more than one appliance.

The appliance may be any appliance to which power is supplied via mains electricity including but not limited to kitchen appliances such as fridges, freezers, microwave ovens, electrical cookers, washing machines, tumble dryers and dishwashers; leisure appliances such as televisions, hi-fis, set-top boxes, video or dvd players or recorders; game consoles; and other appliances such as electric boilers, central heating water pumps, pool pumps, air conditioning units, personal computers, vacuum cleaners, irons and lawn mowers.

A measured event may be identified as an event associated with a specific appliance believed to be present based on probability of a match as discussed above alone, however one or more further data sources may be taken into account in order to verify the match if desired (for the avoidance of doubt, "verify" as used herein means increasing the confidence in a match being correct or increasing the calculated probability of a match being correct, and does not necessarily mean determining with absolute certainty that a match is correct). It will be appreciated that any sensor within a household may provide this further data, including but not limited to the following:

Water consumption for appliances such as washing machines. For example, if an event associated with a washing machine is identified as a match then the confidence in an accurate match may be increased by determining if water was consumed at the same time as electricity was consumed for the relevant event series. In a more sophisticated analysis, measurement of a household's water demand over time may be used to identify water consumption signatures of appliances present in the household that can be matched to known water consumption signatures of known appliances. For instance, a water consumption signature may be based on changes in rate of water consumption with time in a manner analogous to the electrical appliance signatures described above.

Gas consumption for appliances that consume both gas and electricity in the same way as water consumption described above.

Temperature of appliances that change temperature with use, for example refrigerators, freezers and boilers.

Temperature difference between household ambient temperature and external temperature.

Movement sensors such as passive infrared sensors to determine if a household is occupied. For example if no movement is sensed within the household then it may be inferred that the household is empty in which case the confidence in accuracy of a match for an appliance that is used during occupancy, such as a television, is reduced. On the other hand, the confidence in accuracy of a match for other appliances, such as refrigerators, may remain unchanged. The use of movement sensor data to verify a match may take into account the length of time since a movement was last sensed.

Probability data in particular data derived from:

i) Inferred data. If certain appliances are present in a household then probability of certain other appliances being present may be inferred. For example, if a DVD player is present then it may be inferred that a television is present.

ii) Socio-economic data, seasonal data and/or geographic data that may indicate a high probability of a certain appliances being present. For example the probability of an appliance being present in a household will vary based on the nature of the household (e.g. domestic or office) and the geographic location of the household. With respect to location of the household, factors affecting the likelihood of a given appliance being present in a given household may include demographics of household residents in the area in which the household is located. Similarly, the climate in the location of the household may affect the likelihood of certain appliances being present—for instance, likelihood of heating appliances being present and in use is higher in relatively cold climates whereas likelihood of cooling appliances being present an in use is likewise higher in warmer climates.

iii) Behavioural data. The time of day at which an event is detected may be taken into account. For example, a possible match with an event series associated with operation of a lawnmower may be verified if the relevant event series occurred during the day, however the match may be discarded or accorded a lower probability of being accurate if the relevant event series occurred at night. The use of certain appliances may also vary over the course of a year and from season to season, and this variation may also be taken into account in assessing the probability of a match being correct. For example, the confidence in the accuracy of a match for a heating appliance may be higher in the winter than in the summer, and vice versa for a cooling appliance. The variation in frequency and intensity of use of such appliances over the course of a year may be taken into account. For example, a heater may be on continuously at a high power consumption level during winter months, and while it may also be on during spring months it is likely to be used less frequently and/or at a lower power consumption level.

By taking into account one or more of these further information sources it may be possible to identify a measured event with a high degree of confidence in cases where matching of the event to an appliance event probability density map alone gave a low probability of the measured event being associated with that appliance. Likewise, measured events that were believed to be associated with appliances known to be present based on appliance event map matching may in fact be found to be unlikely to be present or definitely not present when information from these further data sources is taken into account. Accordingly, such optional analysis based on further information sources may be used to determine that previously unidentified measured events are associated with known appliances or vice-versa.

Identification of an appliance using a combination of electricity consumption data and other data is described above, however in one aspect of the invention an appliance may be matched based on a combination of measured data and inferred data in which electricity consumption data is only one possible form of measurable data that is not necessarily measured and used in order to identify an appliance. This combination may be a combination of measured data and inferred data or it may be a combination of two or more different types of measured data such as temperature and water consumption.

Moreover, it will be appreciated that use of these other data sources can provide information on consumption not only of electricity but also of other utilities, in particular gas and water.

In addition to the identification of the measured events as associated with specific appliances, other measured data that was not used to carry out identification such as energy consumed over the course of a day and minima and maxima in energy usage over the course of a day can be stored and/or communicated to the user to provide a detailed picture of energy consumption within the household over the course of a day. The changes in energy usage over the course of a day can be linked to the appliances that were detected in operation during those times to provide the user with detailed energy consumption information, and the effect of different appliances on electricity consumption. Alternatively, or additionally, this data can be supplied to a utility provider or other party for analysis of the data for that single household alone, or in combination with data from one or more further households forming a database from which information such as behavioural patterns of users may be determined.

This data can be used to provide a very detailed picture of utility consumption within a household, including the time and frequency of use of appliances.

A target for energy consumption may be set using the measured data, either alone or in combination with other data such as by comparison with average consumption of other households or peer groups. In addition to setting a target for energy consumption, the data could be used to suggest behavioural changes, such as turning off devices that do not appear to be in active use or reducing use of appliances that are used more frequently than average.

Measured data may also be used to identify faulty appliances. For example, operation of a faulty appliance may give the same event series as a normal appliance but with higher power levels. A user may therefore be alerted to a potential fault in the appliance.

In addition to providing data that can be used to review and adjust consumption of utilities, the measured data may also be used to provide healthcare services. For example, a service may be provided to vulnerable individuals such as the elderly and/or individuals that live alone wherein the detection of a significant change in consumption of utilities triggers an alert to check on the wellbeing of those individuals. The significant change may be the occurrence or absence of a specific detectable event, such as a failure to detect use of a specific appliance within a specific time period, or a failure to detect use of any appliances at all for a specified length of time and/or within a specified time period.

Appliance Detection

The appliance identification technique discussed above relies upon appliance event probability density maps being stored and available for the appliances believed to be present in a household.

A method of identifying what appliances are present in a household and generating and storing the corresponding appliance event probability density maps will now be described. It should be understood that identification of an appliance in this context does not necessarily mean that an exact identity, for example a make and model, is established, but only that the presence of an appliance and the properties of events associated with the appliance are identified.

Figure 12A:
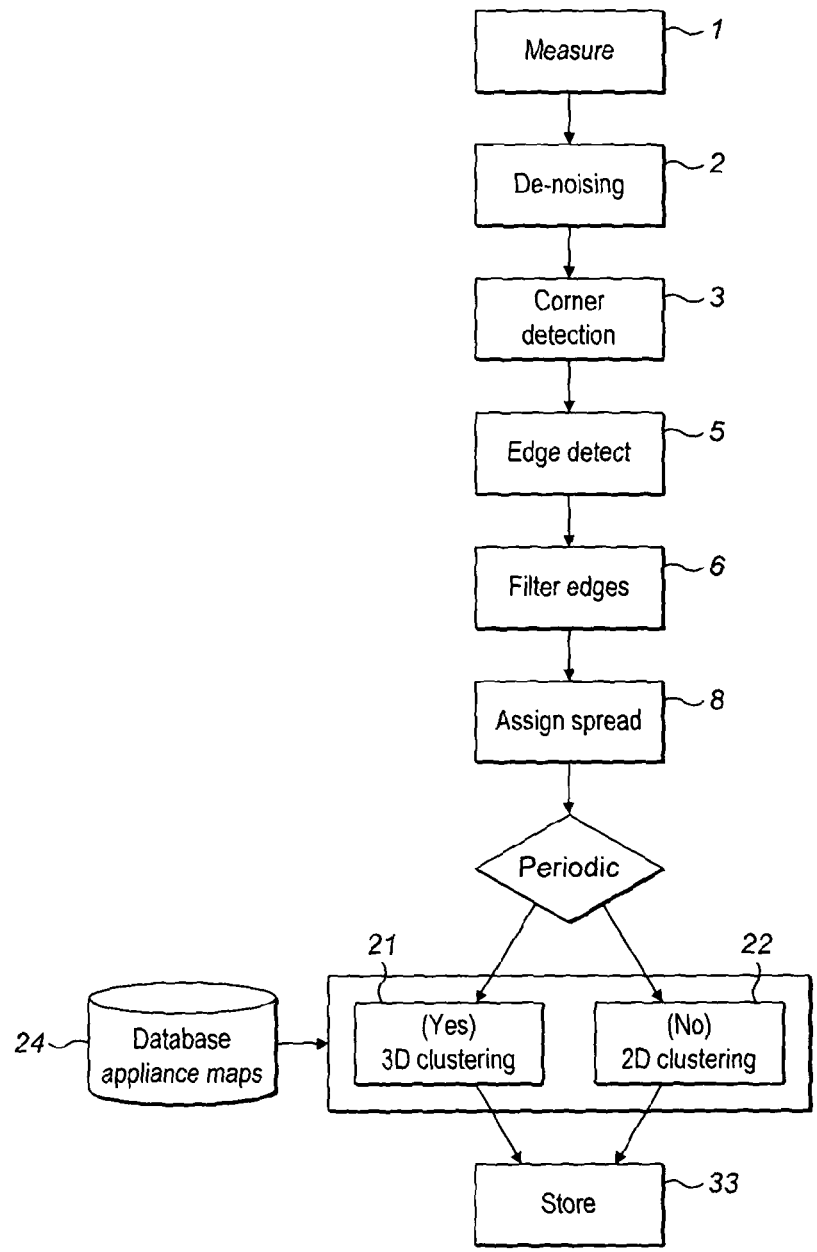
FIG. 12a is a further flowchart illustrating measuring, analysis and matching steps according to the method of the invention.

The method is illustrated in FIG. 12a with respect to electricity consumption, and may be divided into three broad steps: (A) Measurement of electrical data at regular measurement points, in particular at regularly spaced time points; (B) Creation of an electricity consumption profile based in particular on changes in electricity demand, in particular power, between measurement points; and (C) Identifying appliances present in the household and storing energy consumption profiles associated with events of the identified appliances in a database.

Each of these steps is described in more detail below. While the method is described hereinafter primarily with respect to measurement and analysis of electricity consumption, in order to identify events and appliances associated with consumption of 20 electricity, it will be appreciated that the same steps may equally be taken using data relating to consumption of gas or water utilities.

Measurement

The measurement step is essentially the same as described above with reference to FIG. 1. Accordingly, the measuring step 1 and filtering step 2 shown in FIG. 12a are 25 essentially the same as the measuring step 1 and filtering step 2 shown in and described with reference to FIG. 1.

B) Compression and Profile Creation

The compression step is similar to that described above with reference to FIG. 1. The compression step 3 shown in FIG. 12a is essentially the same as the compression step 3 shown in and described with reference to FIG. 1.

Following the compression step 3 an edge detection step 5 is carried out. The edge detection step 5 carries out an On/Off detection algorithm in essentially the same way as the step 5 of the method of FIG. 1.

Following the edge detection step 5 data regarding the detected On/Off pairs is passed to an edge filtering step 6.

The edge filtering step 6 operates in essentially the same way as the step 6 of FIG. 1 to produce a series of events.

The measured event values produced by the edge filtering step 6 are subjected to a spread assigning algorithm step 8 which determines whether each of the measured events is a periodic event or a non-periodic event. As discussed above, each measured event is classified as periodic if there is another measured event having a similar change in power occurring after the measured event with a spread time below a predetermined threshold. If no such event having a similar change in power is identified with a spread time below the threshold is identified the event is classified as non-periodic.

The difference between power levels of events which is regarded as similar, and the length of the threshold time can be selected in practice based on the properties of the system and the measured appliances. In one example a threshold time value of 250 seconds may be used.

C) Identifying Appliances

The periodic measured events are then passed to a periodic event clustering process 21, while the non-periodic measured events are passed to a non-periodic event clustering process 22.

Figure 12B:
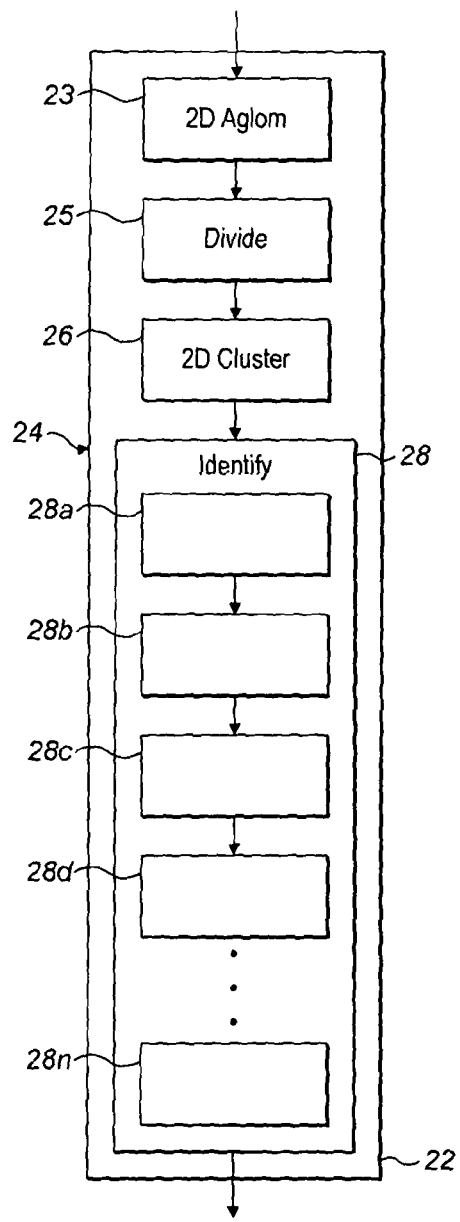
Figure 12C:
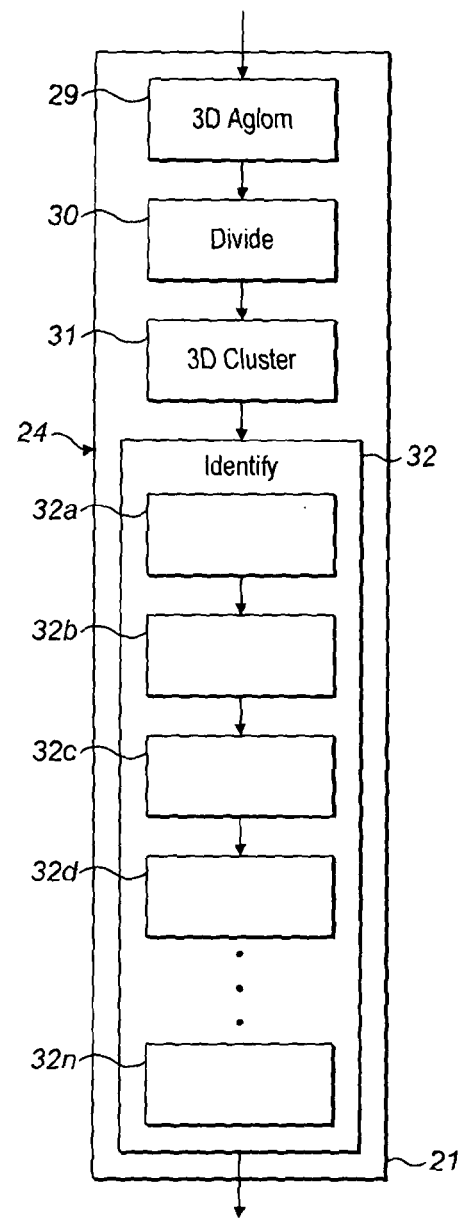

The non-periodic event clustering process 22 is shown in more detail in FIG. 12*b*. In the non-periodic event clustering process 22 the measured event values are subject to two-dimensional model based clustering. In a preferred embodiment the measured event values are first subjected to a two-dimensional agglomeration step 23 to form the measured events into groups. In one example the two-dimensional agglomeration step 23 may carry out the agglomeration into groups using a grouping process based on two-dimensional appliance event maps for generic appliances stored in a generic appliance profile database 24 rather than using the standard generic Gaussian model. Since the purpose of the clustering step 22 is to identify appliances it may be advantageous to agglomerate the measured events based on the known shapes of probability density maps of actual appliances. The useful effects of this may be understood by considering that the agglomeration step 23 tends to produce clusters of measured events having the correct shape for the appliances being looked for.

Figure 19:
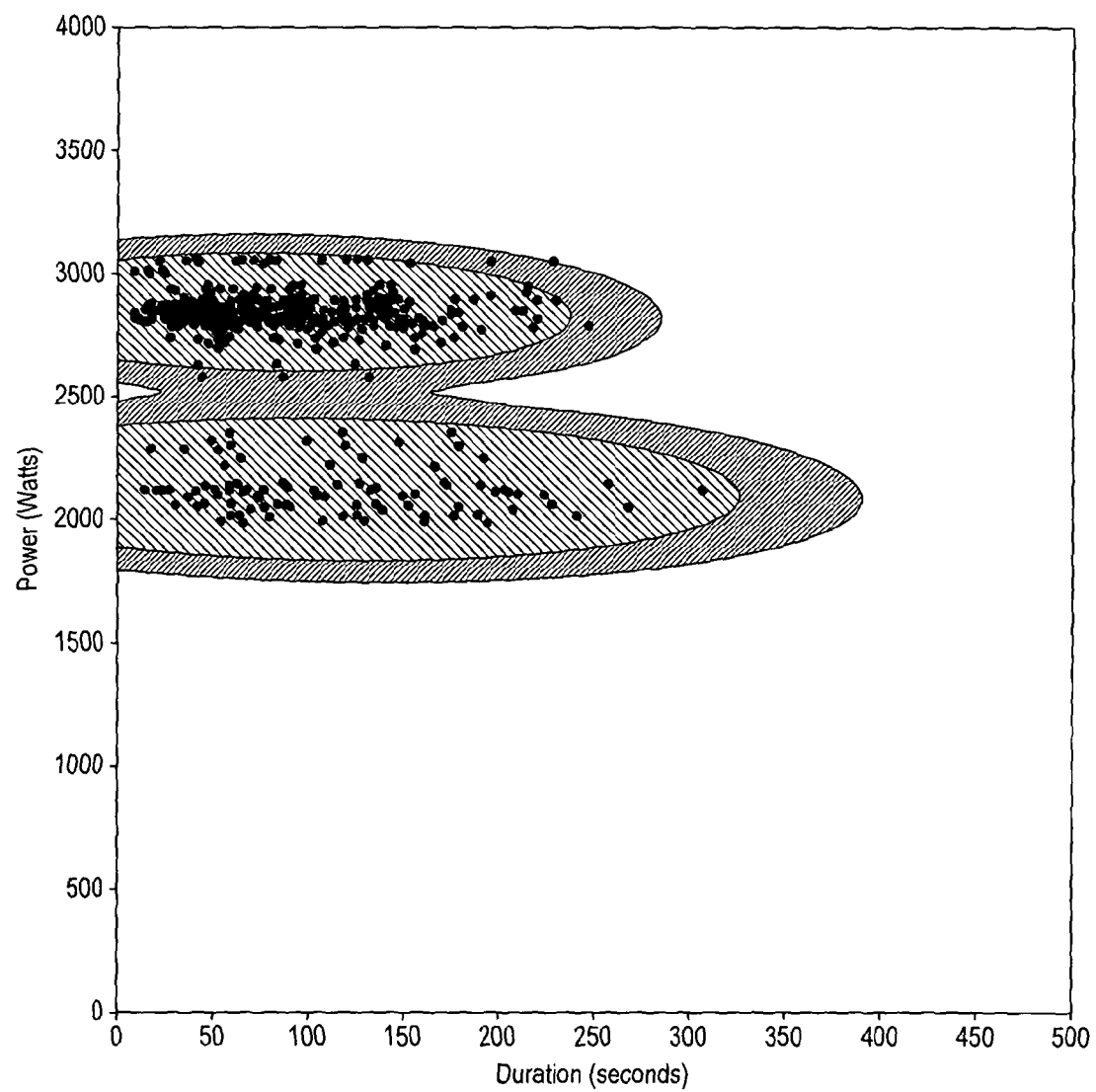
FIG. 19 shows an example of a two-dimensional appliance event probability density map for a generic appliance.

An example of a two-dimensional appliance event probability density map for a generic appliance is shown in FIG. 19. This example shows a map for a generic kettle.

It is not essential to carry out an agglomeration step 23 as part of the event clustering step 22.

Further, it is not essential to carry out agglomeration using the two-dimensional appliance event maps for generic appliances. It is possible instead to carry out the agglomeration step using a standard generic Gaussian model instead.

The agglomerated measured event values are then subjected to further steps of the model based two-dimensional clustering technique.

Figure 13A:
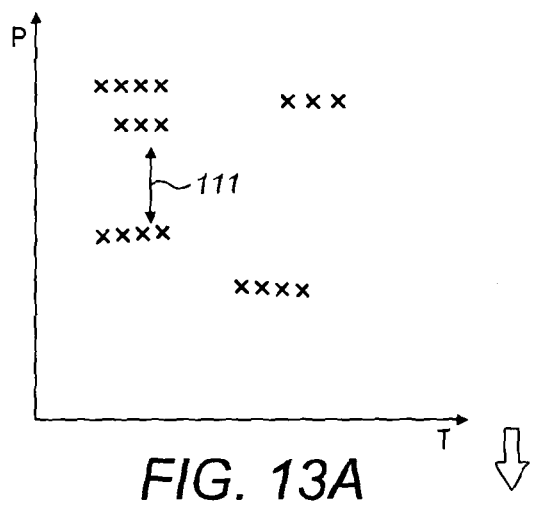
FIGS. 13a to 13c illustrate steps in an event dividing process used in the method of the invention.
Figure 13B:
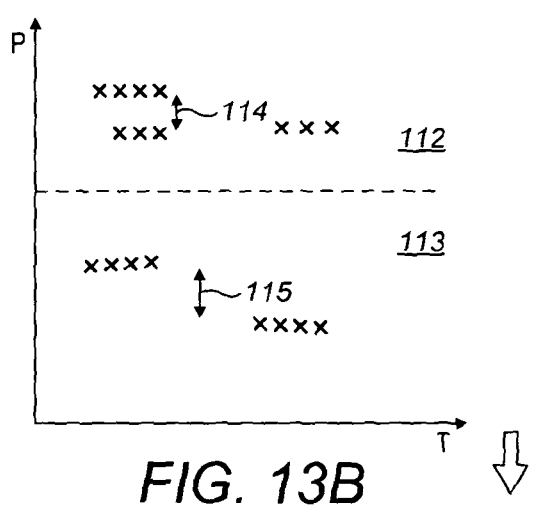
Figure 13C:
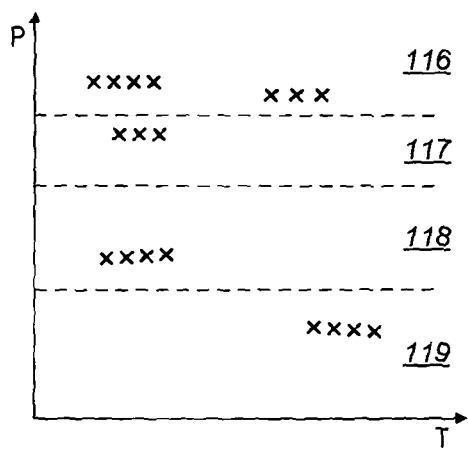

In a preferred embodiment of the invention, instead of using a conventional model-based clustering technique the two-dimensional clustering begins with an initial dividing step 25 which divides the measured events into groups based on their power values. This dividing process carried out in the dividing step is shown in explanatory diagrams in FIGS. 13A to 13C.

The measured real power and duration values of the measured events are examined and the differences between the power values of events having adjacent power values is assessed, i.e. the vertical spacing of the plotted points in FIG. 11A is assessed. Events having adjacent power values are events having the next highest or lowest power values to each other. The largest separation in the power dimension between events having adjacent power values is identified, in FIG. 11A the separation 111.

The measured events are then split into two groups arranged on either side of this identified largest power separation, thus the events of FIG. 11A are split into two groups 112 and 113 on opposite sides of the separation 111.

The process of assessing the differences in power values and splitting the events into two groups on opposite sides of the largest separation is then repeated iteratively for each of the groups 112 and 113 separately. As a result, the group 112 in FIG. 11B is split about the largest power separation 114 of group 112, and the group 113 in FIG. 11B is split about the largest power separation 115 of the group 113. The group 112 is then split into two groups 116 and 117 on opposite sides of separation 114, and the group 113 is split into two groups 118 and 119 on opposite sides of separation 115, as shown in FIG. 11C.

This process of splitting groups in two at the largest power value separation is repeated iteratively until groups are produced having a largest power value separation between adjacent event power values which is below a predetermined threshold.

In practice this splitting process has been found to effectively separate measured values of different appliance events into different groups. This is because appliance events usually tend to be stable in their power value, reflecting the physical operation of the appliances themselves. As a result, splitting the data by power value in this way ensures that different measured events corresponding to different instances of the same appliance event will be placed in the same group. Of course, each group may still contain measured events corresponding to different appliance events. Further, although measured events corresponding to different instances of the same appliance event will be placed in the same group, it is possible for different events relating to different parts, or different operations, of the same appliance to be in different groups.

In a preferred embodiment the predetermined threshold corresponds to the anticipated, or measured, noise level. In some embodiments the threshold may be 100 W or 200 W.

Each of the split groups of measured events produced by the splitting step 25 is then separately subjected to a two-dimensional clustering process in a clustering step 26. The non-periodic measured events are subjected to a two-dimensional clustering process based on measured real power change and duration values associated with the measured event in the model based clustering step 26. Although not identical, this clustering step has much in common with the appliance detection processes discussed above.

In this two-dimensional clustering step 26 each group or set of measured events y can be described in two coordinates $y_i=(p_i, d_i)$ where $p_i$ are the real power magnitudes of the measured events and $d_i$ the durations of the measured events. The candidate measured events can therefore be plotted in a 2-dimensional graph, and will typically form clusters.

One particularly advantageous way of partitioning this set y is using a technique known as finite mixtures model-based clustering. This technique has two particularly important benefits: it can automatically determine both the best partitioning of the data set as well as determine the optimal number of groups within the data set. In other words it can be carried out automatically without requiring any human intervention or judgement to determine what the best split of the data into different clusters should be.

The high-level outline of the finite mixtures clustering technique involves an agglomerative clustering step, an Expectation-Maximization algorithm, as well as a Bayesian Information Criterion. The candidate measured event points are modelled using finite mixtures of general volume, shape and orientation, giving the optimal amount of flexibility for event identification purposes. In the preferred embodiment the candidate measured event points have already been divided into groups having a relatively low range of power values, so that the groups are narrow in the power dimension, so that models having a narrow power dimension should be used.

Given our set of events y labelled by $y_1, \ldots, y_n$ the likelihood for a mixture model with G components is given by:

$$L_{MIX}(\theta_1, \ldots, \theta_G; \tau_1, \ldots, \tau_G | y) = \prod_{i=1}^{n} \sum_{k=1}^{G} \tau_k \phi_k(y_i | \mu_k, \sum_k)$$

Where $\tau_k$ is the probability that an observation belongs to the k th component $$\left(\tau_k \geq 0; \sum_{k=1}^{G} \tau_k = 1\right),$$

and commonly the k th component of the mixture is given by $$\phi_k(y_i | \mu_k, \sum_k) = \frac{\exp\left\{-\frac{1}{2}(y_i - \mu_k)^T \sum_k^{-1} (y_i - \mu_k)\right\}}{\sqrt{\det(2\pi \sum_k)}}$$

With $\mu_k$ and $\Sigma_k$ denoting the means and covariance matrices. Our data is therefore characterised by groups or clusters centred at the means $\mu_k$, with the geometric features (volume, shape and orientation) of the clusters determined by the covariances $\Sigma_k$.

We may parameterize the covariance matrices through eigenvalue decomposition in the following way:

$$\Sigma_k = \lambda_k D_k A_k K_k^T$$

Where $\lambda_k$ describes the volume of the cluster, $A_k$ its shape and $D_k$ its orientation. The idea of model-based clustering is to treat these as independent sets of parameters, and allow them to vary among clusters.

Many further details on the general techniques of model-based clustering, describing the Expectation-Maximization process and the Bayesian Information Criterion, will be known to the skilled person in this field and can be found in the literature, and we will not describe these in detail herein.

The result of this process is to group measured events into clusters according to their measured property values, in the described embodiment the measured real power and duration values. It is possible that an event may be regarded as being in more than one cluster. The clusters are probability density maps.

Referring to FIG. 12b, the grouped clusters of non-periodic event values produced by the two-dimensional clustering step 26 are compared to a series of two-dimensional appliance probability density maps for different generic appliances taken from a generic appliance map database 24 in a series of identification steps 28.

These comparisons are carried out by comparing the values of the three parameters of the cluster probability density map and the appliance probability density map, c, r and μ, where c defines the number of clusters or groups in the probability density map, μ defines the location of the centre of each cluster or group, and r is a covariance matrix defining the geometry, shape and size, of each cluster or group.

In a first identification step 28a each cluster is compared to generic two-dimensional appliance probability density event maps for electric showers and the probability that the cluster of events corresponds to operation of an electric shower is determined. If the probability is higher than a predetermined threshold the cluster of events is identified as a shower. When a cluster is identified as a shower all events in the cluster are removed from consideration in further identification steps. In other words, once a cluster of events has been identified as a particular appliance the cluster is not considered to see if it may be another appliance, and if events in the cluster are also in other clusters, all events in the cluster are removed from other clusters. This reduces the computational load associated with repeatedly comparing clusters of events to appliance maps of incorrect appliances and avoids the problem of resolving the conflict if an event is identified as corresponding to operation of two or more different appliances.

The probability that a cluster of events corresponds to a particular appliance can be determined by a comparison of the cluster to an event probability density map and taking into account the Z score, the cluster properties, number of events within a cluster, and similar criteria.

Each remaining cluster is then compared in a second identification step 28b to generic two-dimensional appliance probability density event maps for kettles and the probability that the cluster of events corresponds to operation of a kettle is determined. If the probability is higher than a predetermined threshold the cluster of events is identified as a kettle. When a cluster is identified as a kettle the cluster is removed from consideration in further identification steps.

Each remaining cluster is then compared in a third identification step 28c to generic two-dimensional appliance probability density event maps for washing machine heaters and the probability that the cluster of events corresponds to operation of a washing machine heater is determined. If the probability is higher than a predetermined threshold the cluster of events is identified as a washing machine heater. When a cluster is identified as a washing machine heater the cluster is removed from consideration in further identification steps.

The comparison and identification is to a washing machine heater, as opposed to a washing machine as such, because other components of a washing machine, such as the drive motor, typically have very different properties to the heater. Accordingly, the different components of a washing machine are looked for separately, although of course the identification of any component of a washing machine will generally imply the presence of all components of the washing machine. Accordingly, having detected various parts of a washing machine, or other complex multi-part appliance, the probability of the combination of parts representing usage of the appliance as a whole can be assessed. Other complex multiple-component machines can be treated in a similar manner.

Each remaining cluster is then compared in further identification steps 28d to 28n to generic two-dimensional appliance maps for a sequence of other non-periodic appliances such as microwave ovens, lights, and the like, and the probability that the cluster of events corresponds to operation of each of these appliances is determined in turn. If the probability of any comparison is higher than a predetermined threshold the cluster of events is identified as the appropriate appliance. When a cluster is identified as an appliance the cluster is removed from consideration in further identification steps.

In the identification steps described above the appliance maps used to identify the appliance associated with each event cluster is a generic appliance probability density map defining the properties of appliances of a particular type. These generic maps are generated by aggregating large numbers of appliance event records.

The non-periodic event clustering process 22 described above identifies the appliances associated with non-periodic events.

As discussed above, periodic measured events are passed to a periodic event clustering process 21 by the periodicity determination step 20. The periodic event clustering process 21 is shown in more detail in FIG. 10c.

In the periodic event clustering process 21 the measured event values are subject to three-dimensional clustering. In a preferred embodiment the measured event values are first subjected to a three-dimensional agglomeration step 29 to form the measured events into groups. In one example the three-dimensional agglomeration step 29 may carry out the agglomeration into groups using a three-dimensional grouping process based on three-dimensional appliance event probability density maps for generic periodic appliances stored in the generic appliance profile database 24. The three dimensional agglomeration and clustering are based upon the real and/or reactive power values of the events together with the duration of the event and the spread time associated with the event.

Figure 20:
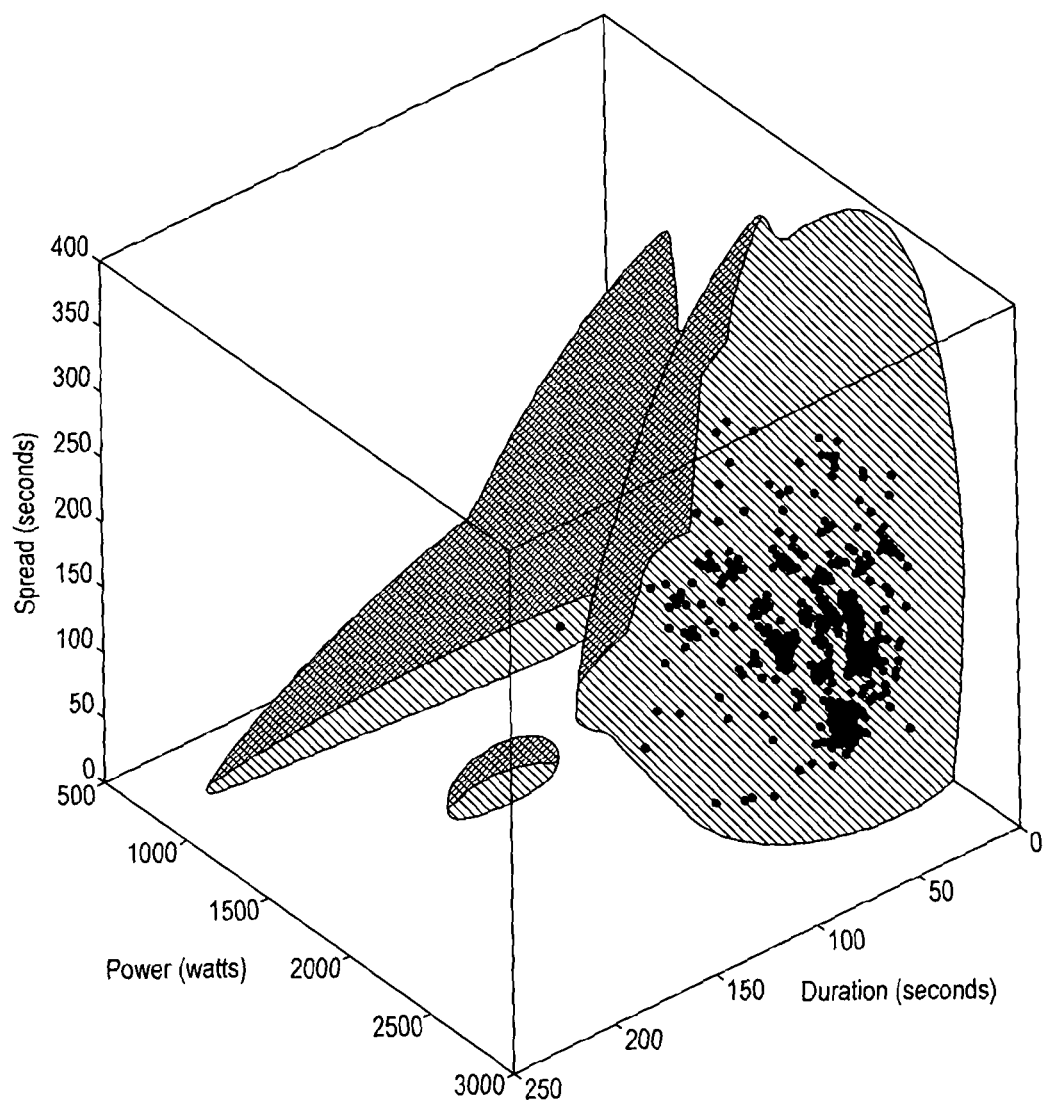
FIG. 20 shows an example of a three-dimensional appliance event probability density map for a generic periodic appliance.

An example of a three-dimensional appliance event probability density map for a generic periodic appliance is shown in FIG. 20. This example shows a map for a generic iron.

It is not essential to carry out an agglomeration step 29 as part of the event clustering process 21. Further, it is not essential to carry out agglomeration using the three-dimensional appliance event maps for generic appliances. It is possible instead to carry out the agglomeration step using a standard generic Gaussian model instead.

The agglomerated measured event values are then subjected to a three-dimensional clustering.

In a preferred embodiment of the invention, the three-dimensional clustering begins with an initial dividing step 30 which divides the measured events into groups based on their power values. The dividing step 30 carries out a similar dividing process to the dividing step 25 discussed above, dividing the events into groups based upon the separation between events having adjacent power values.

Each of the split groups of measured events produced by the dividing step 30 is then separately subjected to a three-dimensional model based clustering process in a three-dimensional model based clustering step 31. The periodic measured events are subjected to a three-dimensional model based clustering process based on the measured real power change and duration and spread values associated with the measured event in the three-dimensional model based clustering step 31.

In this three-dimensional model based clustering step 31 each group or set of measured events y can be described in three coordinates $y_i=(p_i, d_i, s_i)$ where $p_i$ are the real power magnitudes of the measured events, $d_i$ the durations of the measured events, and $s_i$ the spread of the measured events. The candidate measured events can therefore be plotted in a 3-dimensional graph, and will typically form clusters. The mathematical treatment of measured events using finite mixtures model-based clustering is similar to that described above, but extended into a third dimension.

The grouped three-dimensional clusters of periodic event values produced by the three dimensional clustering step 31 are three dimensional probability density map functions, and they are compared to a series of three-dimensional appliance event probability density function maps for different generic appliances taken from a generic appliance map database 24 in a series of identification steps 32.

In a first periodic identification step 32a each cluster is compared to generic three-dimensional appliance maps for hobs and the probability that the cluster of events corresponds to operation of a hob is determined. If the probability is higher than a predetermined threshold the cluster of events is identified as a hob. When a cluster is identified as a hob all events in the cluster are removed from consideration in further identification steps.

In a second periodic identification step 32b each cluster is compared to generic three-dimensional appliance maps for ovens and the probability that the cluster of events corresponds to operation of an oven is determined. If the probability is higher than a predetermined threshold the cluster of events is identified as an oven. When a cluster is identified as an oven all events in the cluster are removed from consideration in further identification steps.

In a third periodic identification step 32c each cluster is compared to generic three-dimensional appliance maps for irons and the probability that the cluster of events corresponds to operation of an iron is determined. If the probability is higher than a predetermined threshold the cluster of events is identified as an iron. When a cluster is identified as an iron all events in the cluster are removed from consideration in further identification steps.

Each remaining cluster is then compared in further periodic identification steps 32d to 32n to generic three-dimensional appliance maps for a sequence of other periodic appliances such as tumble drier heaters, microwave ovens, dishwasher heaters, fridges, dishwasher pumps, washing machine pumps and the like, and the probability that the cluster of events corresponds to operation of each of these appliances is determined in turn. If the probability of any comparison is higher than a predetermined threshold the cluster of events is identified as the appropriate appliance. When a cluster is identified as an appliance the cluster is removed from consideration in further identification steps.

In other embodiments further criteria may also be used in order to identify periodic event clusters. For example, statistical analysis of the periodic events may be analysed and taken into account when determining probability.

Some appliances may contain both periodic and non-periodic parts, or may be able to act periodically or non-periodically in different situations. Microwave ovens are considered in both the non-periodic and periodic identification steps 28 and 32 because a microwave oven may have non-periodic power consumption when operating at full power, and may have a periodic power consumption when operating in a lower power mode, such as a defrost setting.

The identities of the appliances identified in the identification steps 28 and 32 are stored in a step 33 to generate a household record of which appliances are present in the household. Further, in step 33 the data regarding the measured clusters of events relating to each identified appliance is stored as an appliance event probability density map for that specific appliance.

As discussed above it is expected that it will usually be possible to identify an appliance as being of a particular generic type of appliance. In some cases when this is not possible it may still be possible to identify that an appliance is present and to define the properties of events associated with the appliance sufficiently clearly to allow an appliance event probability density map for that specific appliance to be produces and stored.

Figure 21:
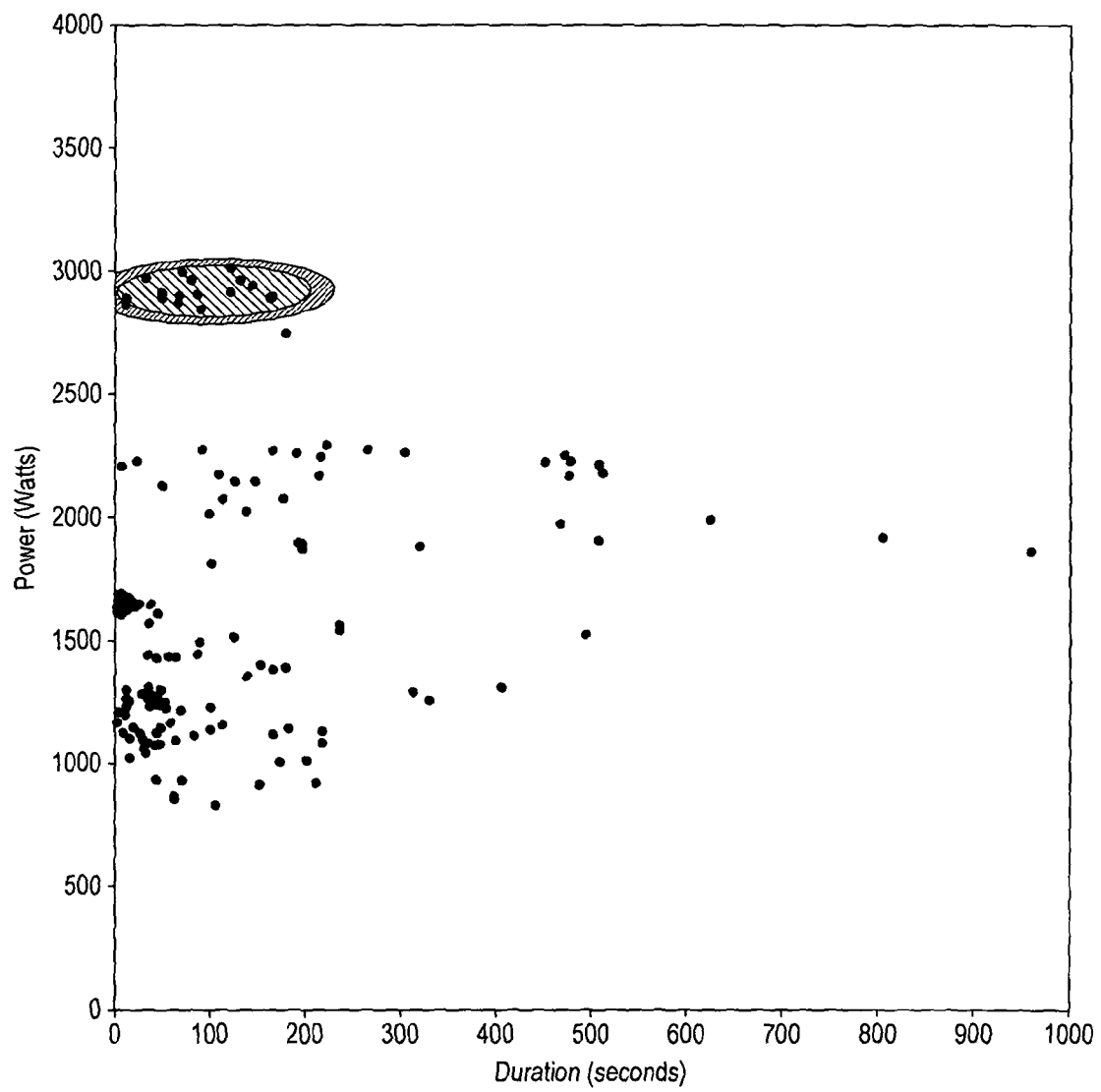
FIG. 21 shows an example of a two-dimensional appliance event probability density map for a specific appliance.

An example of a two-dimensional probability density map for a specific appliance is shown in FIG. 21. This example is a two-dimensional probability density map for a specific kettle.

Figure 22:
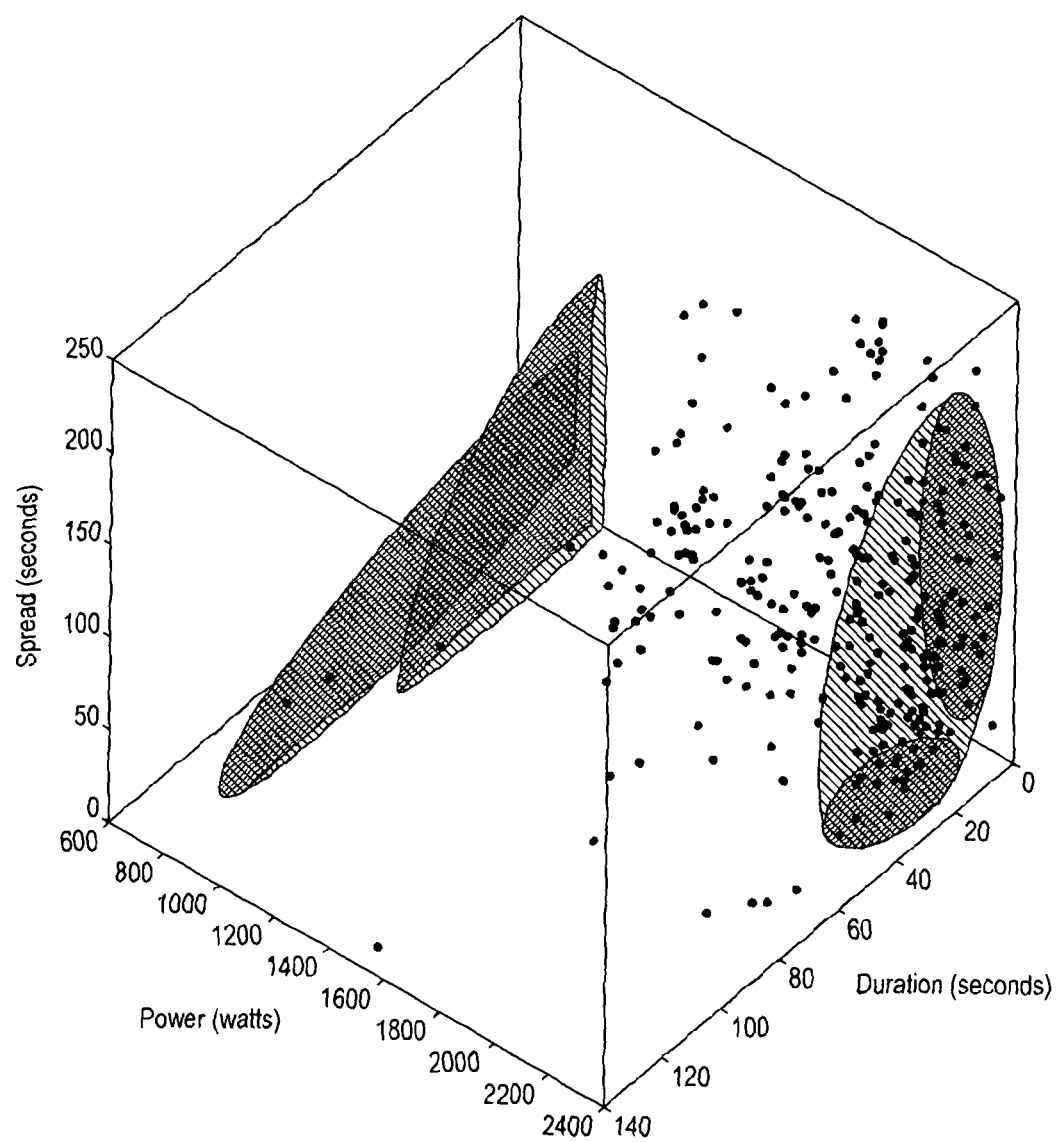
FIG. 22 shows an example of a three-dimensional appliance event probability density map for a specific periodic appliance.

An example of a three-dimensional probability density map for a specific appliance is shown in FIG. 22. This example is a two-dimensional probability density map for a specific iron.

In a preferred embodiment the appliance probability density maps for specific appliances identified as present in the household in the appliance detection process which are stored in step 33 are stored in the database 10 for use in the appliance detection process.

In a preferred embodiment of the invention, instead of using either a conventional model-based clustering technique or the clustering with an initial dividing step described above, clustering is first attempted using a conventional model-based clustering method. If this clustering does not produce acceptable clusters the clustering is repeated using the clustering with an initial dividing step technique. This may be applied to both the two-dimensional and three-dimensional clustering.

In some examples the clusters produced by the conventional model-based clustering technique may be regarded as not acceptable if the clusters have a power range above a predetermined threshold. In one example the threshold may be 200 W.

The methods described above allow multiple devices to be detected as present from the measured power consumption data in a single operation, that is, effectively simultaneously.

In some embodiments it may be preferred to separate data regarding events having different power levels and separately process the events relating to events having different power levels. For example, events could be separated into groups based on their change in power at the edge detecting or edge filtering steps 5 or 6, or in a dedicated power based separation step. Each of the separated groups of events may then be subject to a model based clustering process 21 and 22 separately.

In one example events may be separated into a group of low power events associated with a power change of 800 W or less and a group of high power events associated with a power change of over 800 W.

In carrying out appliance identification, that is identification of appliances present in a household other data sources may be taken into account as discussed above for appliance detection.

In a preferred embodiment, in the appliance detection process, when a measured event is identified as being associated with a specific appliance known to be present, the data regarding the measured event is incorporated into the stored appliance map for that appliance in the database for use in analysing future events. This will allow the appliance detection process to learn and become more accurate over time.

Figure 14:
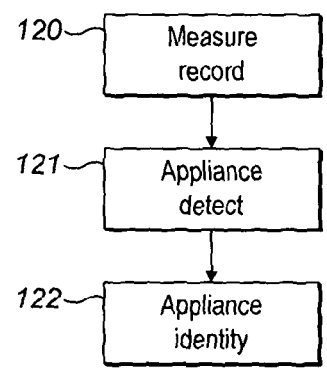
FIG. 14 is a further flowchart illustrating steps according to the method of the invention.

A preferred method of operation of the appliance detection and appliance identification processes will now be described with reference to FIG. 14.

Initially, when the appliance detection and appliance identification processes are first used in a household there will be no record of what appliances are present in the household, or any record of power consumption events associated with the operation of household appliances. Accordingly, in order to gather this information, in a first step 120 of the method the measurement and compression steps A) and B) common to the appliance detection and appliance identification processes described above are carried out over a period of time and the identified events are recorded. The length of time for which the measurement and compression is carried out and the identified events recorded should be sufficient to allow most appliances in the household to be used multiple times. In a preferred embodiment the measurement and compression steps are carried out and the identified events recorded for a week.

When sufficient event data has been recorded, in the preferred embodiment after a week, the identifying appliances process C) of the appliance identification process described above is carried out using the recorded identified events in an appliance detection step 121. As discussed above, the identities of the appliances identified as being present in the household are recorded and the appliance maps for the specific appliances identified are stored in a database.

Once the appliance detection step 121 has been completed, the steps of the appliance identification process discussed above are carried out based on newly made measurements of power consumption in an appliance identification step 122. In the appliance identification step 122 the stored appliance maps for the specific appliances identified in the appliance detection step 121 are used to identify the appliances.

Thus, the method accumulates power consumption data for an initial period, and then processes the accumulated data to identify what appliances are present and generate their specific appliance maps. Subsequently the method uses the generated specific appliance maps to identify appliance events in real time as new power consumption data is received. This procedure has the advantage of reducing the computational demands of the method. The appliance identification process is more computationally demanding than the appliance detection process.

This allows the appliance identification to be carried out with relatively little computing power, allowing the process to be scaled up to process data from very large numbers of households without the computing requirements becoming excessive.

Power consumption data may be accumulated and the appliance identification process repeated from time to time in order to identify any changes to the appliances present in the household and to identify any rarely used appliances.

The appliance identification process may be repeated periodically. Alternatively, or additionally, the appliance identification process may be repeated on a user request, for example when a user has purchased a new appliance, or in response to failure to match a detected event to an appliance in the appliance detection process. In practice it is inevitable that some detected events will not be able to be matched to an appliance, for example because power supply interruptions or appliance failures are detected as events, accordingly it may be preferred to only carry out the appliance identification process in response to the number of unmatched events, or the number of unmatched events in a particular time, exceeding a predetermined threshold. Alternatively, the process may be repeated when a previously detected appliance stops being detected, this may imply that it has been replaced by a new appliance. In making this decision factors such as how long it has been since the appliance was last detected and how frequently it was previously detected may be taken into account.

In one embodiment the results of the appliance detection process are sent to a server to be incorporated, together with results from other households, into generic appliance event probability density maps.

Apparatus

Figure 15:
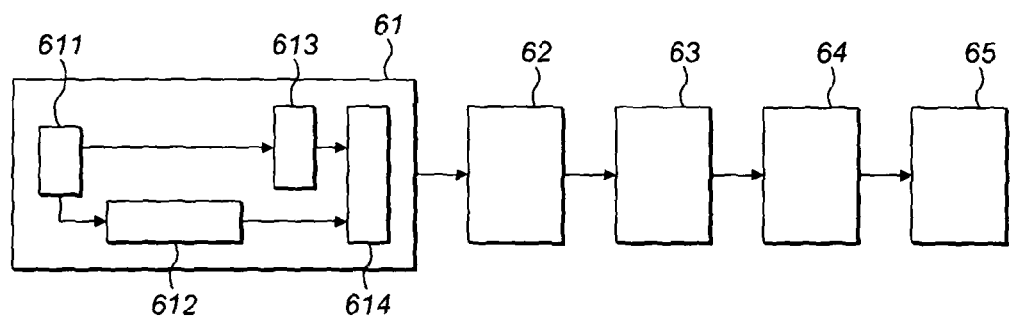
FIG. 15 schematically illustrates apparatus for implementation of the method of the present invention.

FIG. 15 illustrates apparatus for implementation of the method of the present invention comprising a sensor 61, a display 62, an uploader 63 and a back end 64.

Sensor 61 comprises an electricity measurement unit 611 and may be as described in WO 2008/142431.

The periodically measured values of real power (RP) and reactive power (REP) from the measurement unit 611 and associated time stamps are fed to a processor 612 where compression is applied using software running on the processor. Alternatively, the compression may be carried out by hardware in the form of an application specific integrated circuit (ASIC) in the sensor. Separately, for each time point the following measurements are fed from the measurement unit 611 into a control register 613 that that controls the sensor set-up, in particular the sensor sampling rate:

- power readings at each time point
- cumulative energy at each time point
- Energy total for a time period (e.g. 24 hours), and maximum and minimum energy consumption during that time period.

The measured data is communicated wirelessly using communication means 614 to a portable user display 62, and from there via wired or wireless communication to a user's PC 63.

It will be appreciated that the compression of real and reactive power data dramatically reduces the amount of information communicated between components.

An uploader application installed on the user's PC 63 conducts a serial number check to determine which household the information originates from and then transfers the uploaded data via a network to a server 64 where time stamps associated with the measured data are used to give the actual time of day when measurements were made.

Finally, the back end 65 comprises an event identification device for processing the compressed data in order to identify events using the matching process described above.

Figure 16:
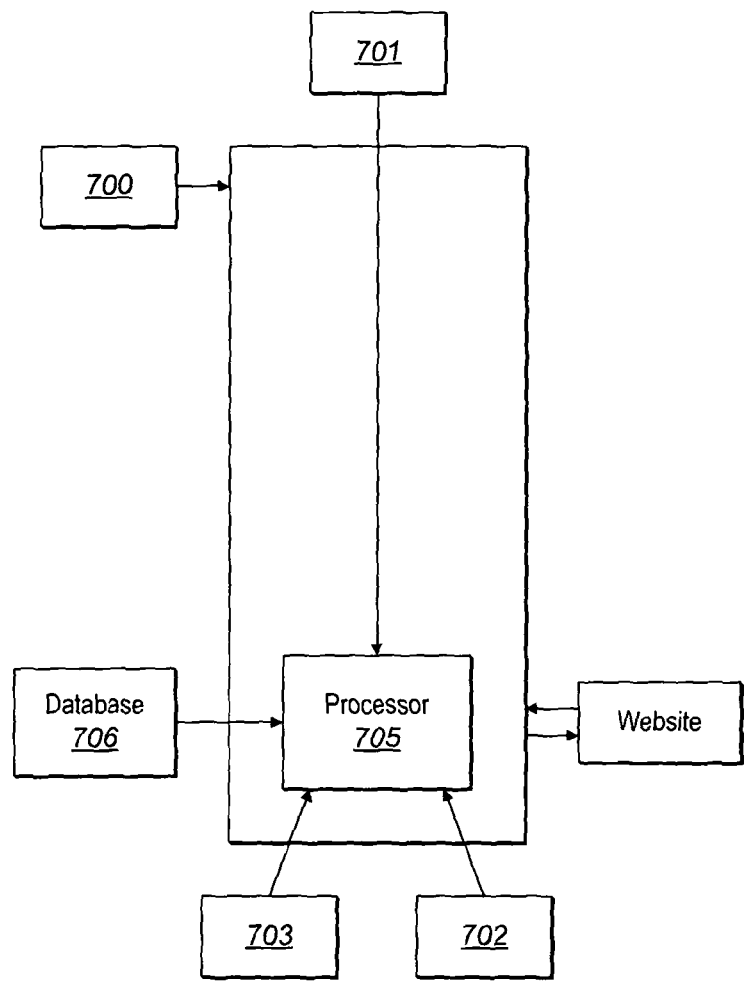
FIG. 16 schematically illustrates a event identification device

The event identification device is described in more detail in FIG. 16. The compressed electricity consumption data 701 is fed to event identification device 700 where a processor 705 carries out the above methods in order to detect and identify appliance events. This may be based solely on analysis of the electricity consumption data, however other data sources may be used to verify accuracy. These other data sources may be:

- Measured data 702, in particular data relating to consumption of other utilities. Data relating to consumption of other utilities may be compressed and provided in the form of a matrix in the same way as electricity consumption data, and compared to utility consumption profiles stored in database 706 or another database.
- Facts 703 regarding the household, for example facts provided by an occupier of the household regarding appliances present in the household.
- Probability data, for example the probability of a candidate appliance being in operation at the measured time of day. This probability data may be stored in database 706 or another database.

Processor 705 can take account of these further information sources in order to verify the accuracy of a detection or identification, or to discard the detection or identification if incompatible with information from other data sources. Processor 705 would carry out the various steps of the methods described above.

Figure 17:
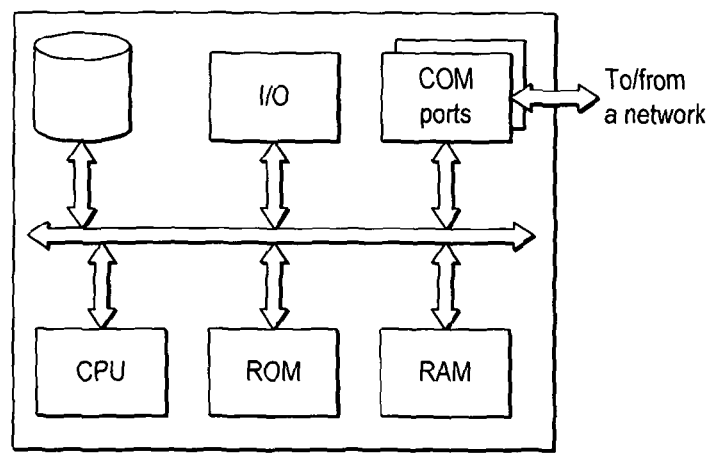
FIG. 17 is a simplified functional block diagram of a computer that may be configured as a host or server, for example, to function as the event identification device in the system of FIG. 16.

FIG. 17 illustrates a system wherein electricity consumption is measured and electricity consumption data is compressed and transmitted via user display 62 to an event identification device. In an alternative embodiment, measurement of electricity consumption, compression of electricity consumption data and event identification may take place within a single device, for example a device in communication with database 706, thus reducing or eliminating the need for a user to upload data transmitted from the sensor.

Use of identified events

The identified events can be used to populate a library of appliances for that household and, upon first use of the event identification device, this library may be communicated via a website to the user's PC for verification by the user of appliances identified within the household, and to illustrate to the user the patterns of usage and energy consumption by those appliances. Following this initial communication of the library, updates to the library may also be communicated to the user, for example if removal or addition of an appliance to the household is identified.

In addition, other measured data that was not used to form an event matrix such as energy consumed over the course of a day and minima and maxima in energy usage over the course of a day can be communicated to the user to provide a detailed picture of energy consumption within the household over the course of a day. The changes in energy usage over the course of a day can be linked to the appliances that were detected in operation during those times to provide the user with detailed energy consumption information, and the effect of different appliances on electricity consumption. Alternatively, or additionally, this data can be supplied to a utility provider or other party for analysis of the data for that single household alone, or in combination with data from one or more further households forming a database from which information such as behavioural patterns of users may be determined.

This data can be used to provide a very detailed picture of utility consumption within a household, including the time and frequency of use of appliances.

A target for energy consumption may be set using the measured data, either alone or in combination with other data such as by comparison with average consumption of other households or peer groups. In addition to setting a target for energy consumption, the data could be used to suggest behavioural changes, such as turning off devices that do not appear to be in active use or reducing use of appliances that are used more frequently than average.

Measured data may also be used to identify faulty appliances. For example, operation of a faulty appliance may give the same event series as a normal appliance but with higher power levels. A user may therefore be alerted to a potential fault in the appliance.

In addition to providing data that can be used to review and adjust consumption of utilities, the measured data may also be used to provide healthcare services. For example, a service may be provided to vulnerable individuals such as the elderly and/or individuals that live alone wherein the detection of a significant change in consumption of utilities triggers an alert to check on the wellbeing of those individuals. The significant change may be the occurrence or absence of a specific detectable event, such as a failure to detect use of a specific appliance within a specific time period, or a failure to detect use of any appliances at all for a specified length of time and/or within a specified time period.

The invention described above is able to identify appliances present in a household and subsequently identify use or operation of the identified appliances entirely automatically. However, manual user input to the method may be used if desired. For example, a user may wish to inform the computer system when new appliances are added to the household, or register the types or identities of appliances in the household.

The invention has been discussed with respect to event and appliance identification from measurements of electrical power consumption or demand which are measurements of real power and/or reactive power. The described event and appliance identification could additionally or alternatively be based on measurements of other power attributes, for example voltage, current, admittance, harmonic distortion, and the like.

The invention has been discussed primarily with respect to consumption of electricity, however it will be appreciated that the methods described herein can equally be applied to consumption of water or gas supplied to a household. For example, with respect to water it will be appreciated that operation of a washing machine or dishwasher will include identifiable water consumption event series. Moreover, other events such as use of a garden hose may be determined based on the volume of water and water flow rate. Each of these events may be verified using other data, such as time of use (for example, an event series that appears to be indicative of use of a garden hose may be given a lower probability of being accurate if it takes place at night). In this way, consumption of water and gas can be monitored and adjusted based on the data generated. Likewise, this data can provide other services, such as healthcare monitoring, either alone or in combination with electricity consumption data.

As shown by the above discussion, functions relating to the identification of an event using utility consumption data may be implemented on computers connected for data communication via the components of a packet data network. Although special purpose devices may be used, such devices also may be implemented using one or more hardware platforms intended to represent a general class of data processing device commonly used so as to implement the event identification functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files of known event profiles used for matching to a measured event profile. The software code is executable by the general-purpose computer that functions as the server or terminal device used for event identification. In operation, the code is stored within the general-purpose computer platform. At other times, however, the software may be stored at other locations and/or transported for loading into the appropriate general-purpose computer system. Execution of such code by a processor of the computer platform or by a number of computer platforms enables the platform(s) to implement the methodology for event identification, in essentially the manner performed in the implementations discussed and illustrated herein.

Figure 18:
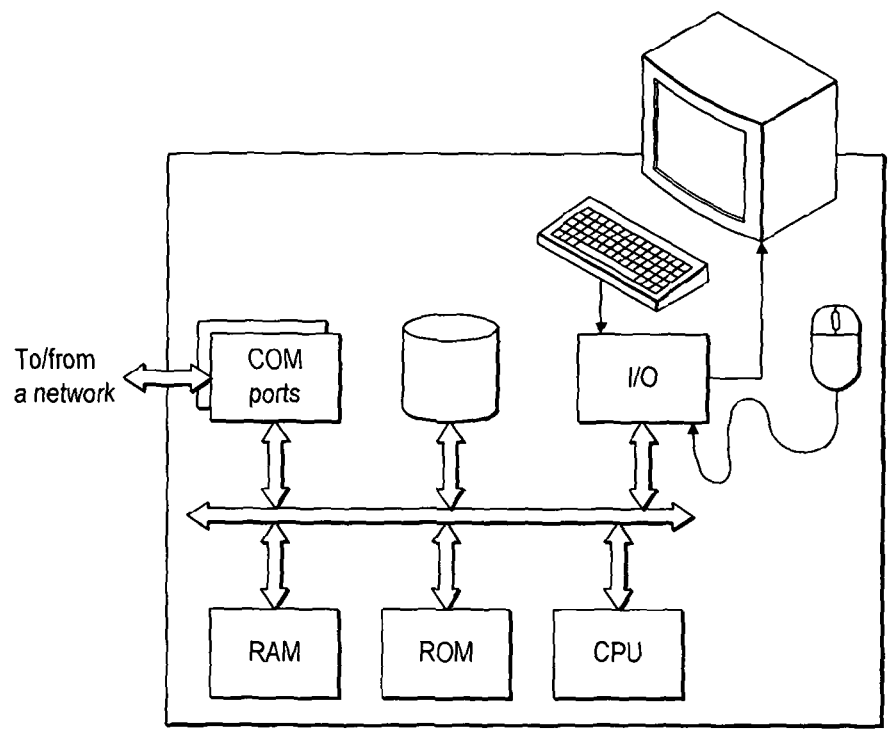
FIG. 18 is a simplified functional block diagram of a personal computer or other work station or terminal device.

FIGS. 17 and 18 provide functional block diagram illustrations of general purpose computer hardware platforms. FIG. 17 illustrates a network or host computer platform, as may typically be used to implement a server. FIG. 18 depicts a computer with user interface elements, as may be used to implement a personal computer or other type of work station or terminal device, although the computer of FIG. 18 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The user terminal computer will include user interface elements for input and output, in addition to elements generally similar to those of the server computer, although the precise type, size, capacity, etc. of the respective elements will often different between server and client terminal computers. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of event identification outlined above may be embodied in programming. Program aspects of the technology may be thought of as "products" or "articles of manufacture" typically in the form of executable code and/or associated data that is carried on or embodied in a type of machine readable medium and/or in a plurality of such media. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the organisation providing event identification services into the event identification computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the event identification, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A method of identifying an event associated with consumption of a utility, the method comprising:
generating a utility consumption profile from utility consumption data, the utility consumption data comprising a plurality of utility consumption values measured at a corresponding plurality of measurement points;
detecting a plurality of events within the utility consumption profile;
wherein the plurality of events are described in coordinates comprising real power magnitudes and durations of the events;
grouping the plurality of events using a clustering process to produce a probability density map;
comparing the probability density map of the plurality of events to a stored profile of events of a particular type that is a probability density map; and
identifying the group of the plurality of events as events of the particular type when the probability density map corresponds to the stored profile of events of the particular type.

2. The method according to claim 1, further comprising:
determining whether the probability density map of the plurality of events corresponds to the stored profile by calculating a probability that the probability density map of the clustered plurality of events corresponds to an event of a type represented by the probability density map.

3. The method according to claim 2, wherein the probability is calculated by comparing respective covariance matrices of the probability density map of the clustered plurality of events and the probability density map of the stored profile of events.

4. The method according to claim 2, wherein the probability is calculated by comparing a respective number of clusters and cluster centre locations of the probability density map of the clustered plurality of events and the probability density map of the stored profile of events.

5. The method according to claim 2, wherein the determining whether the probability density map of the plurality of events corresponds to the stored profile comprises comparing the probability to a predetermined threshold value, and wherein the probability density map of the plurality of events is determined to match the stored profile when the probability exceeds the threshold value.

6. The method according to claim 2, wherein the probability density map of the plurality of events is compared to a plurality of probability density maps of stored profiles of events and the plurality of events are determined to match the stored profile having the highest probability value.

7. The method according to claim 1, wherein the probability density map is a two dimensional probability density map.

8. The method according to claim 1, wherein the probability density map is a three dimensional probability density map.

9. The method according to claim 1, wherein the plurality of events are classified as periodic or non-periodic before comparing the probability density map of the plurality of events with the probability density map of the stored profile of events.

10. The method according to claim 9, wherein the plurality of events are classed as periodic if another event follows each of the plurality of events with a separation in time value below a predetermined threshold.

11. The method according to claim 10, wherein the probability density maps are two-dimensional if the plurality of events are classified as non-periodic and the probability density maps are three dimensional if the plurality of events are classified as periodic.

12. The method according to claim 11, wherein one dimension of each three-dimensional probability density map is a separation in time value.

13. The method according to claim 1, wherein the probability density map of the plurality of events is stored as a utility consumption profile if the probability density map of the plurality of events corresponds to the stored profile of events of the particular type.

14. The method according to claim 13, further comprising:
generating a utility consumption profile from utility consumption data, the utility consumption data comprising a plurality of utility consumption values measured at a corresponding plurality of measurement points;
detecting an event within the utility consumption profile;
comparing the detected event to the stored profile of an event; and
identifying the detected event within the utility consumption profile when the detected event matches the stored profile of an event.

15. The method according to claim 14, wherein determining whether the detected event matches the stored profile comprises calculating the probability that the detected event is an event of the type represented by the probability density map.

16. The method according to claim 15, wherein the determining whether the detected event matches the stored profile further comprises comparing the probability to a predetermined threshold value, and wherein the detected event is determined to match the stored profile when the probability exceeds the threshold value.

17. The method according to claim 15, wherein the detected event is compared to a plurality of stored profiles of events and each of the plurality of stored profiles is determined to match the stored profile having the highest probability value.

18. The method according to claim 15, wherein the probability is determined based on a Mahalanobis distance of the detected event from a cluster centre of the probability density map.

19. The method according to claim 14, wherein the probability density map is a two dimensional probability density map.

20. The method according to claim 15, wherein the probability density map is a two dimensional probability density map.

21. The method according to claim 14, wherein the detected event is classified as periodic or non-periodic before comparing the detected event with the utility consumption profile.

22. The method according to claim 21, wherein the detected event is classed as periodic if another event having a similar size relative to the detected event follows the detected event with a separation in time value below a predetermined threshold.

23. The method according to claim 22, wherein the detected event is compared to a two-dimensional probability density map if the detected event is classified as non-periodic; and the detected event is compared to a three-dimensional probability density map if the event is classed as periodic.

24. The method according to claim 23, wherein one dimension of the three-dimensional probability density map is a separation in time value.

25. The method according to claim 1, wherein the utility is at least one of gas, electricity or water.

26. The method according to claim 25, wherein the utility is electricity.

27. The method according to claim 26, wherein the measured electricity consumption data includes data of real power.

28. The method according to claim 26, wherein the measured electricity consumption data includes data of reactive power.

29. The method according to claim 26, wherein the measured electricity consumption data includes data of reactive power and real power.

30. The method according to claim 25, wherein the utility is water.

31. The method according to claim 1, wherein the plurality of measurement points are a plurality of time points with intervals therebetween.

32. The method according to claim 31, wherein the intervals between time points are in a range of 0.01- 60 seconds.

33. A computer program product, comprising:
a non-transitory computer-readable medium comprising code for:
generating a utility consumption profile from utility consumption data, the utility consumption data comprising a plurality of utility consumption values measured at a corresponding plurality of measurement points;
detecting a plurality of events within the utility consumption profile;
wherein the plurality of events are described in coordinates comprising real power magnitudes and durations of the events;
grouping the plurality of events using a clustering process to produce a probability density map;
comparing the probability density map of the plurality of events to a stored profile of events of a particular type that is a probability density map; and
identifying the group of the plurality of events as events of the particular type when the probability density map corresponds to the stored profile of events of the particular type.

34. An apparatus, comprising:
a memory; and
at least one processor coupled to the memory and configured to:
generate a utility consumption profile from utility consumption data, the utility consumption data comprising a plurality of utility consumption values measured at a corresponding plurality of measurement points;
detect a plurality of events within the utility consumption profile;
wherein the plurality of events are described in coordinates comprising real power magnitudes and durations of the events;
group the plurality of events using a clustering process to produce a probability density map;
compare the probability density map of the plurality of events to a stored profile of events of a particular type that is a probability density map; and
identify the group of the plurality of events as events of the particular type when the probability density map corresponds to the stored profile of events of the particular type.

35. An article of manufacture comprising:
a non-transitory machine-readable storage medium; and
executable program instructions embodied in the machine readable storage medium that when executed by a programmable system causes the system to:
generate a utility consumption profile from utility consumption data, the utility consumption data comprising a plurality of utility consumption values measured at a corresponding plurality of measurement points;
detect a plurality of events within the utility consumption profile;
wherein the plurality of events are described in coordinates comprising real power magnitudes and durations of the events;
group the plurality of events using a clustering process to produce a probability density map;
compare the probability density map of the plurality of events to a stored profile of events of a particular type that is a probability density map; and
identify the group of the plurality of events as events of the particular type when the probability density map corresponds to the stored profile of events of the particular type.

* * * * *